(12) United States Patent
Hennessey

(10) Patent No.: US 6,341,293 B1
(45) Date of Patent: Jan. 22, 2002

(54) REAL-TIME COMPUTER "GARBAGE COLLECTOR"

(75) Inventor: Wade Hennessey, Palo Alto, CA (US)

(73) Assignee: Object Technology Licensing Corp ( * ) Notice: Subject to any disclaimer, the term of this patent is extended or adjusted under 35 U.S.C. 154(b) by 0 days.

(21) Appl. No.: 08/274,923

(22) Filed: Jul. 13, 1994

(51) Int. Cl.$^7$ .............................................. G06F 17/30
(52) U.S. Cl. ..................................... 707/206; 707/103
(58) Field of Search ................................ 395/600, 622; 707/206, 103

(56) References Cited

U.S. PATENT DOCUMENTS

| | | | | |
|---|---|---|---|---|
| 4,775,932 A | * | 10/1988 | Oxley et al. ................. | 364/200 |
| 4,961,137 A | * | 10/1990 | Angesterijin et al. ....... | 364/200 |
| 5,088,036 A | * | 2/1992 | Ellis et al. ................... | 395/425 |
| 5,321,834 A | * | 6/1994 | Weiser et al. ................ | 395/600 |
| 5,355,483 A | * | 10/1994 | Surlet .......................... | 395/650 |

OTHER PUBLICATIONS

N. Bagherzadeh et al, "A parallel asynchronous garbage collection algorithm for distributed systems", Mar. 1991, IEEE Transactions, vol. 13, Iss 1, p. 100–7.*

Kuechlin et al., "On Multi–Threaded List Processing and Garbage Collection", Ohio State University Technical Research Report, pp. 1–15, Mar. 22, 1991.*

* cited by examiner

Primary Examiner—Thomas Black
Assistant Examiner—Charles L. Rones
(74) Attorney, Agent, or Firm—Morgan & Finnegan, LLP

(57) ABSTRACT

The present invention provides a novel method and apparatus for performing real-time computer garbage collection, in a manner that offers unprecedented low bounds on the worst-case frequency and duration of the collection task. The invention is used with a plurality of data objects and with one or more mutator programs. The mutators and a garbage collector run on one or more processors. The mutators each have a corresponding thread with a corresponding thread state. In the present invention, execution of all mutators is temporarily restricted at the start of each new garbage collection cycle. However, unrestricted execution of a mutator is quickly resumed, as soon as that mutator's thread state is processed. The remainder of the garbage collection cycle may be performed concurrently with the mutators. In another feature of the present invention yielding important performance benefits, the mutators are executed subject to a protective write barrier, but the write barrier does not have to be applied to the modification of mutator thread states.

17 Claims, 5 Drawing Sheets

REAL-TIME COMPUTER "GARBAGE COLLECTOR"

FIELD OF THE INVENTION

This invention relates to the field of computer memory management, and in particular to the problem of efficiently performing computer garbage collection in real-time.

BACKGROUND

Computer programs typically make use of variables or similar labels to reference data "objects." A portion of computer memory must be allocated during execution to each such object. Over time, as many such objects are created and used, the available, "free" memory that remains to be allocated in a particular system may begin to run short. As is well known in the art, a variety of methods and techniques have been proposed and implemented to reclaim as "free" and available those portions of computer memory that were originally allocated to program objects that are no longer in use by any running program. This task is generally known in the art as "garbage collection." A great variety of different garbage collection techniques have been developed and used; for example, the reference paper *Uniprocessor Garbage Collection Techniques* by Paul R. Wilson (available through Internet via anonymous FTP from cs.u-texas.edu as pub/garbage/bigsurv.ps) provides a broad survey of existing techniques, and explains commonly used terminology. That paper is incorporated herein in its entirety by this reference.

Prior art garbage collection systems have generally suffered to various degrees from the problem of excessive pause times. This problem arises when garbage collection is performed in real-time, i.e., concurrently with the execution of other live programs running on one or more processors. (In the field of garbage collection, the other live programs are typically referred to as "mutators," because such programs potentially "mutate" or change the state of memory, from the point of view of the garbage collector or "GC.")

For example, suppose that a system contains multiple mutator threads and a single GC thread. (A "thread" is an execution context within a shared address space, as discussed further below.) If the mutators are, for example, trying to present a movie at 30 frames per second, and they require a combined time of 23 ms to generate each frame, then problems will arise if the GC thread is run for more than 10 ms during any particular 33 ms interval. It would therefore be desirable in this scenario to guarantee that the garbage collector will run no more than 30 times per second (i.e., its frequency will be no greater than 30; equivalently, its period will be greater than or equal to 33 ms), and also that each time the garbage collector is run it will execute for a maximum duration of no more than 10 ms.

GC frequency and duration can of course be kept "limited" through brute force, in the sense that the execution time allotted to the GC program may be explicitly rationed under control of the operating system or some other scheduling manager. This does not solve the problem at hand, however, because garbage collectors generally perform certain non-deferable, atomic work that must not be interrupted by mutators, at the risk of causing potential memory corruption. For example, a well-known family of GC schemes known as "copying" collectors (described in the Wilson survey paper, for example) actually copy, to a new location in memory, each data object that is determined not to be garbage (i.e., the object may still be in use by a live program). Since each such data object can potentially be arbitrarily large, and because the copying operation is necessarily atomic, a copying garbage collector may enter a phase where it cannot be interrupted by any mutator for an arbitrarily long period of time. Such GC schemes are generally not satisfactory for real-time systems where a maximum GC duration is required.

While non-copying garbage collectors also exist in the prior art (e.g., Henry G. Baker Jr., The Treadmill: Real-Time Garbage Collection Without Motion Sickness, SIGPLAN Notices Vol. 27 No. 3 at pp. 66–70, March 1992, incorporated herein in its entirety by this reference), many current applications of interest—notably, in the realm of multimedia—require limits on the maximum frequency and duration of garbage collection that the prior art has so far failed to dependably satisfy, at least on general-purpose stock hardware. As a result, systems running multimedia applications and the like have so far been unable to use garbage collection, and have instead been forced to rely on inconvenient, manual storage management techniques.

SUMMARY OF THE INVENTION

The present invention disclosed herein provides a novel method and apparatus for real-time garbage collection that offers unprecedented low bounds on the worst-case for GC frequency and duration.

Briefly, the present invention is used with a plurality of objects and with one or more mutators. The mutators, and the garbage collector itself, run on one or more computer processors, as scheduled by a scheduler. Stock hardware may be used; i.e., special purpose hardware is not necessary. The mutators each have a corresponding thread with a corresponding thread state. In the present invention, execution of all mutators is temporarily restricted at the start of each new garbage collection cycle. However, unrestricted and concurrent execution of each mutator is resumed, as soon as that mutator's thread state is processed by the garbage collector.

In another feature of the present invention, the mutators are executed subject to a protective write barrier. However, the write barrier does not have to be applied to the modification of any mutator thread states, yielding valuable performance benefits.

DETAILED DESCRIPTION OF THE PREFERRED EMBODIMENTS

Basic Concepts and Definitions

Figure 1:
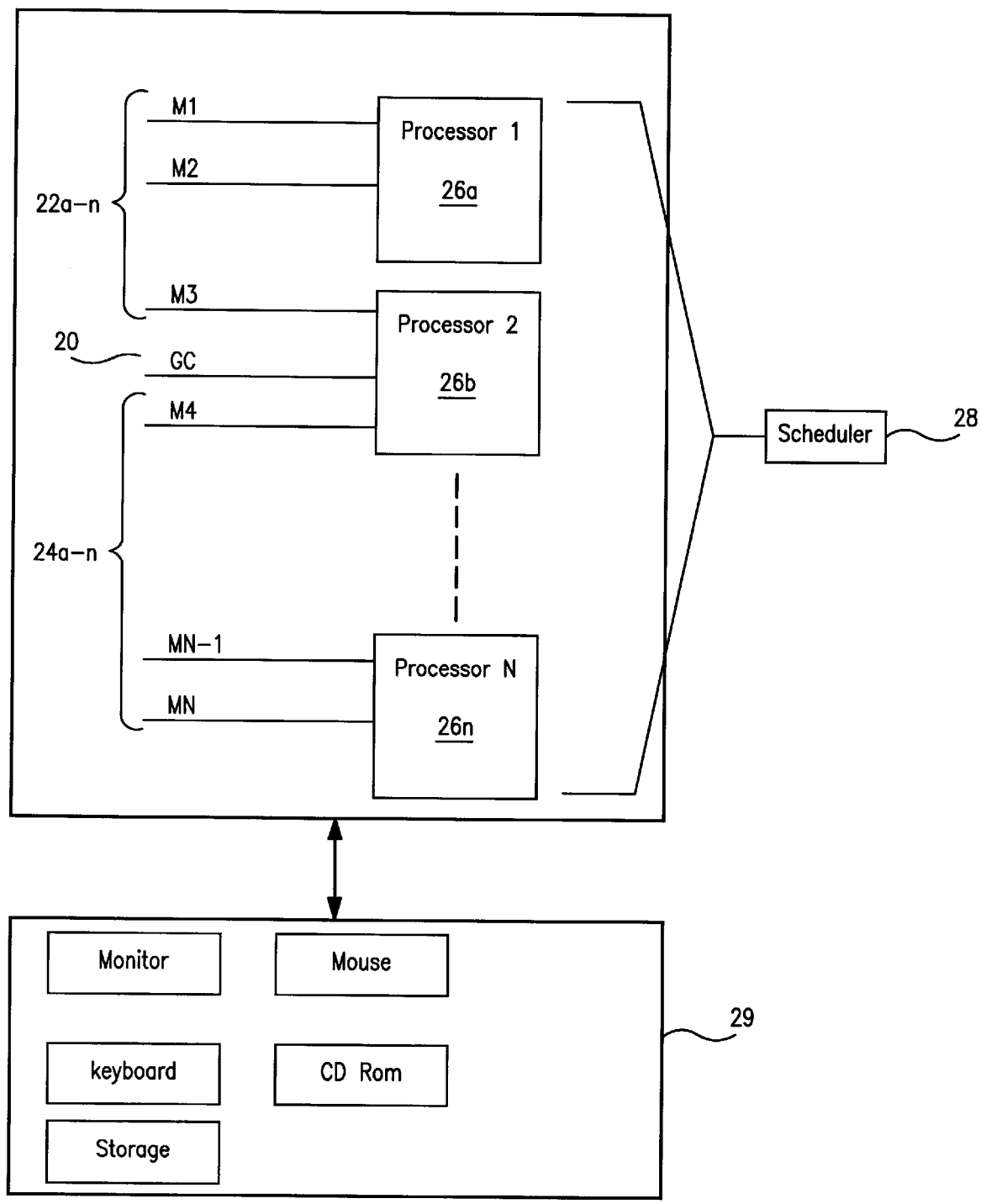
FIG. 1 illustrates representative apparatus for practicing the present invention.

FIG. 1 depicts a representative system that may be employed to embody the present invention. Garbage collection preferably takes place in its own execution thread 20 in real-time and concurrently with the execution of multiple mutator "threads" 22a–n and 24a–n. All of these various threads are run on one or more processors 26a–n. Where, as in the typical case, there are more live threads than processors, Scheduler 28 manages processors 26a–n by allocating each processor's time and resources among the multiple live threads. Processors 26a–n preferably interact with standard input/output facilities 29.

Formally, a thread is an execution context within a shared address space. A thread's "state" is defined by an associated set of local data, such as a run-time stack and a set of registers, or the like. Multiple threads preferably access other data—e.g., global data and heap data—within a shared, common address space. For purposes of illustration, we will often discuss each thread in terms of its associated stack and register set, although it will be readily appreciated by those of skill in the relevant art that alternate implementations of threads and thread states, or the equivalent, are possible, and would generally be within the scope of the present invention.

Figure 2:
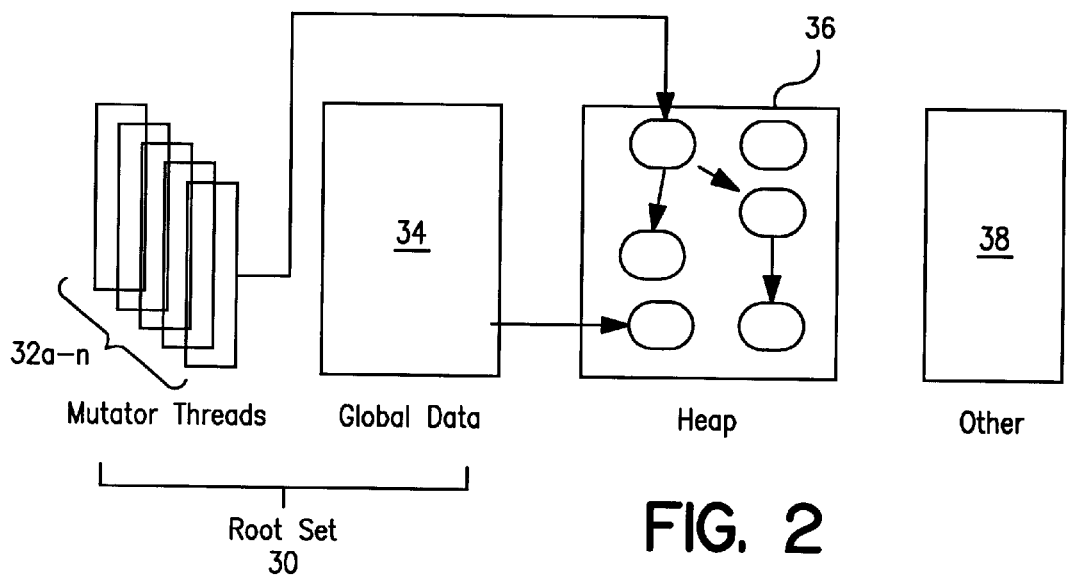
FIG. 2 depicts an illustrative classification of program memory for purposes of the present invention.

FIG. 2 classifies program memory for purposes of garbage collection. The "root set" 30 contains all data which is directly accessible by the program: this includes each thread state 32a–n, as well as all global pointers 34 in the program's data sections. Heap 36 contains pointers which are indirectly accessible by the program via the root set. Any and all other portions of memory 38 (e.g., static code segments storing machine instructions) are ignored by the garbage collector.

An object's state with respect to the garbage collector is conceptually described by one of four "colors":

1. White—These objects are currently subject to collection. It is as yet uncertain whether these objects are live (i.e., accessible to a running mutator program) or garbage (i.e., inaccessible).
2. Black—These objects have been classified as live during the current GC cycle, and any pointers within these objects have also been traced. The notion of a GC cycle is further described below.
3. Gray—These objects have been classified as live during the current GC cycle, but at least some of the pointers within these objects have not been traced yet.
4. Green—These objects are garbage, free to be allocated.

Figure 3:
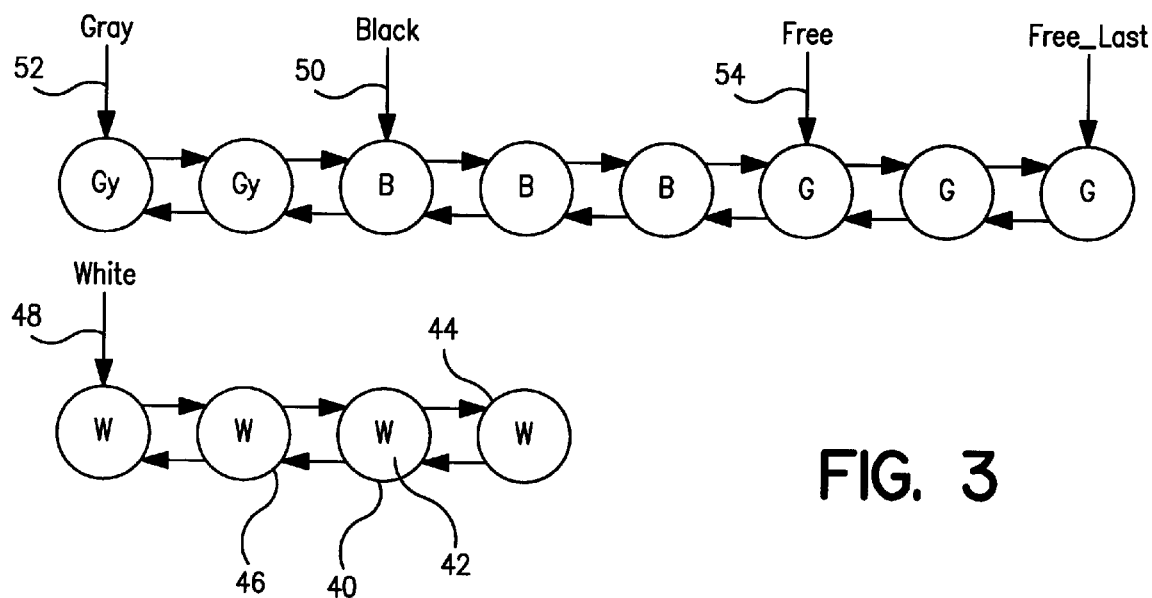
FIG. 3 illustrates the external pointers and the doubly-linked used to keep track of object "color" in a preferred embodiment of the invention.

As shown in FIG. 3, the color information for an object is redundantly represented in two ways. First, the color information is stored directly within each object (such as for sample object 40) in an explicit field (such as sample color field 42). In addition, each object contains link pointers (such as sample pointers 44 and 46) that place it within a doubly linked list corresponding to its color. Thus, four external pointers—White 48, Black 50, Gray 52, and Free (or Green) 54—point to the first object in each such list. Baker's Treadmill (cited earlier above) similarly linked every object subject to garbage collection into a doubly-linked list reflecting its status.

With respect to the color information stored directly in an object, Gray and Green may be represented by constant bit patterns. However, because of the "flip" operation performed at the start of each GC cycle, as described below, the meanings of the two respective bit patterns corresponding to Black and White alternate, and are determined by the values of two global variables (e.g., current_black and current_white). If the color bit pattern matches current_black, then the object is black; likewise, a match with current_white indicates that the object is white.

The Garbage Collection Cycle

Figure 4:
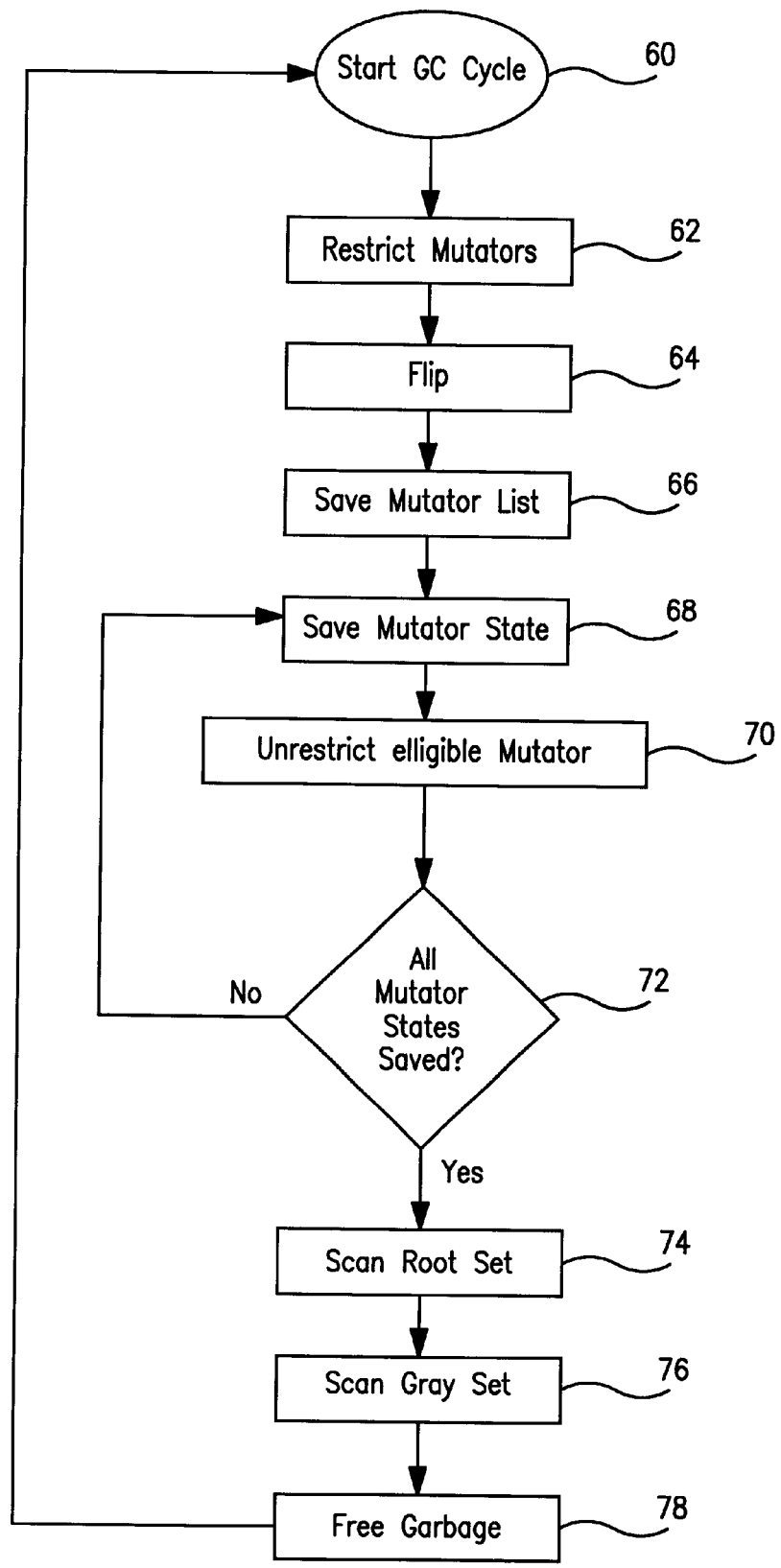
FIG. 4 shows a flow chart of garbage collection steps that are performed in the preferred embodiment of the present invention.

Garbage collection is performed in cycles. The basic steps of each such cycle are charted in FIG. 4. According to the present invention, when a new cycle is commenced, all mutators are temporarily restricted from modifying memory by creating any new data objects. This is reflected in steps 60 and 62. A mutual exclusion ("mutex") lock or similar protection mechanism may be readily employed to effect this purpose. The net effect is that as each new GC cycle begins, scheduler 28 will temporarily suspend the execution of any mutator that attempts to create a new object. Of course, the start of a new cycle can be delayed until a convenient moment if required by the mutators.

An important aspect of the present invention is that the temporary restriction on mutators is extremely brief, as explained below. At step 64, a "flip" is performed. At the start of each GC cycle, every data object that is a candidate for potential collection starts out initially as Black. That is because all data objects when first created are initially allocated as Black, and because any data object that existed during the previous cycle and that was not labelled as Free garbage must have been labelled Black. Therefore, the basic purpose of flip 64 is to relabel all of the Black objects as White (i.e., as current candidates for collection). This is done simply by making the White list pointer point to the head of the previous Black list, and by re-initializing the Black list pointer. The meaning of the color information stored directly in data objects is likewise flipped, very simply by swapping the values of current_black and current_white.

At this point, scheduler 28 preferably suspends the execution of all mutators completely. (In fact, for simplicity, execution of mutators may be temporarily suspended in entirety beginning at step 62.) At step 66, a list of all live threads is saved. Next, at step 68, the state information (e.g., the live portion of stack and register information) for each mutator thread is processed. This "processing" step may be done directly by performing scanning step 74 described below, or may be more quickly performed by simply saving each thread state—such as by copying that information to a "mirror" area—one thread at a time, for subsequent use in step 74. The mirror area may preferably be allocated in memory at thread creation time for usage by the garbage collector. In fact, "saving" a thread state may be performed without necessarily copying the thread information right away, but instead simply setting (under control of the operating system) the protection status of thread state as "copy-on-write." As is well known in the art, setting memory protection status in this way will cause actual copying to take place only when and as needed.

Importantly, as represented by step 70, each mutator is permitted to resume executing in unrestricted fashion as soon as its own thread information has been processed. Thus, any "pause" experienced will be minimal; a mutator can rest assured that its unrestricted execution will be resumed within an infinitesimally short amount of time that varies only with the size of the thread state for that mutator. In practice, all of these initial steps (i.e., steps 60 through 66 and step 68 with respect to a given mutator) will collectively require no more than a handful of milliseconds, at worst.

Thus, once thread state information has been processed, a mutator is essentially free to execute whenever it desires (from the perspective of the garbage collector), until the end of the GC cycle. The remainder of the GC cycle—which actually, in terms of duration, is by far the lion's share of each cycle—is devoted to tracing through memory and identifying those data objects that are still in use and cannot be recycled.

As shown in steps 74 and 76, this remaining portion of the GC cycle really proceeds in two primary phases. The first phase, step 74, involves scanning the root set's pointers: i.e., pointers stored in either the saved thread states or in global data. These pointers identify memory locations that are directly accessible by an executing program. Pointers stored in root set locations may reference objects in the heap; scanning or tracing the root set thus simply identifies all of the heap objects that may be directly referenced by a running program through root set pointers. For each root set pointer, the collector determines if the pointer points to an object in the heap. If so, the object's color is inspected; if the object was until now White, then the object is made Gray. An object is made Gray by removing it from the White list via the double link pointers, and prepending it to the head of the Gray list. Since all Gray objects ultimately turn Black by the end of a GC cycle, the Gray list is contiguous with the Black list, and the Gray list pointer points at the current head of the Gray list. Thus, after step 74 is completed and all of the root pointers have been examined, the Gray list will contain all data objects that are directly accessible via root set pointers.

Figure 5A:
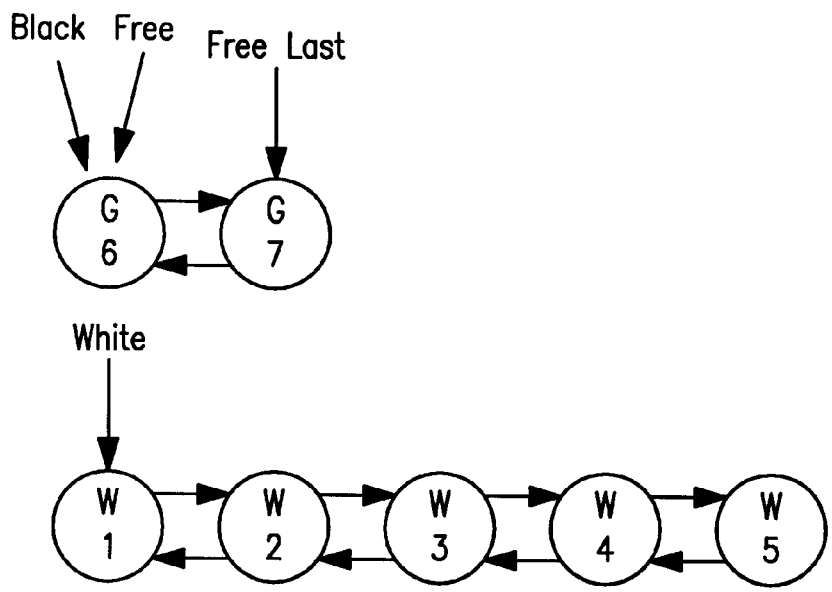
FIG. 5a depicts a simple example of some objects and their "color" status prior to scanning.
Figure 5B:
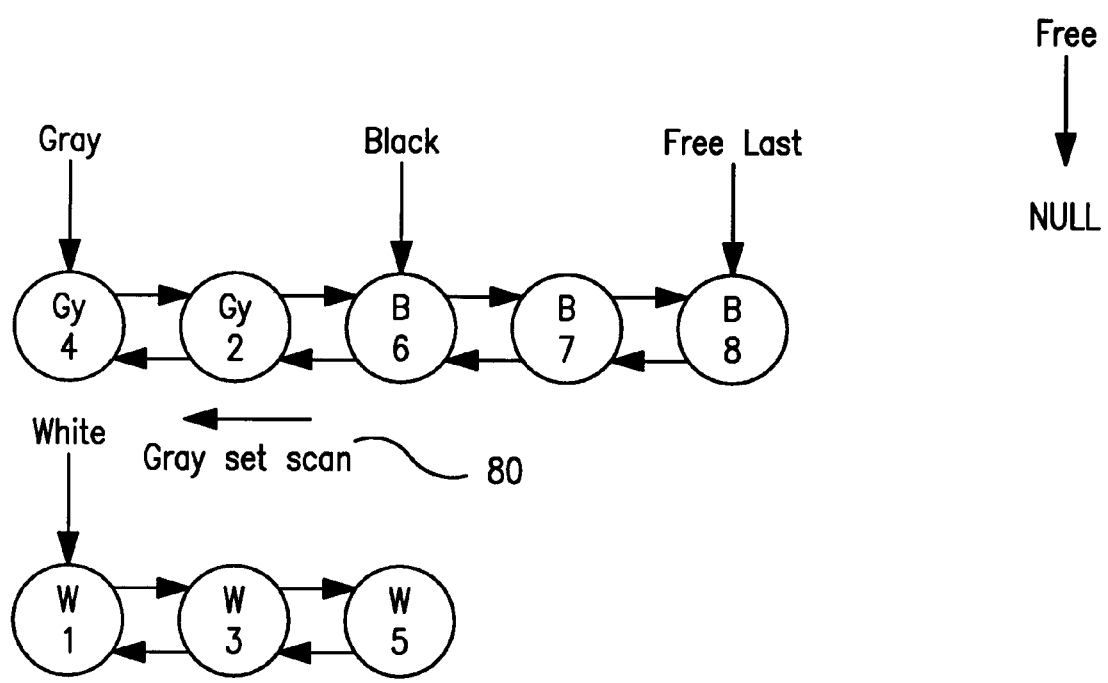
FIG. 5b depicts the same simple example, but after some scanning has been done in accordance with the present invention.

FIGS. 5a and 5b provide a simple example to illustrate the activity of scanning the root set during step 74. FIG. 5a shows objects 1–5 as White, before scanning has been done. FIG. 5b reflects the results of some scanning: objects 1, 3, and 5 are still White, but the scan step has determined that objects 2 and 4 are pointed to by the root set, and those two objects have therefore been made Gray. In addition, FIG. 5b shows that new objects, 6,7, and 8, have been created (presumably by concurrently executing mutators), and have all been properly initialized as Black. Objects 6 and 7 were "recycled" from Free objects 6 and 7 (FIG. 5a). In this example, no objects remain on the Free list for further recycling, although additional memory not yet managed by the garbage collector may exist (such as was used for allocating object 8).

Referring once again to FIG. 4, the next step 76 identifies all of the indirectly accessible objects: i.e., those data objects that are not pointed to directly by the root set, but can instead be transitively referenced, in that other accessible objects within the heap point at them. This step 76 involves iteratively scanning or tracing every Gray object—i.e., every object that is live, and that contains pointers to currently White objects—so as to follow all accessible pointers to any other objects within the heap; such objects when found are in turn also marked as Gray. This technique is continued recursively, until the entire tree of reachable objects is traced out and identified.

In more detail, scanning at step 76 proceeds from left to right, as indicated in FIG. 5b at 80. The Gray object immediately to the left of the first Black object—in this case, Gray object 2, to the left of Black object 6—is the next Gray object to scan. Just as with the root set, all pointers in each Gray object must be examined. When every pointer within a given object has been traced, that object's color is changed to Black: i.e., it's internal color is directly changed, and the Black list pointer is advanced one object to the left using the double links. If a pointer in a Gray object being scanned is found to reference a White object in the heap, that heap object is in turn removed from the White list and prepended to the left-most end of the Gray list. Scanning the Gray list in this manner effectively provides a breadth-first traversal through the tree of all accessible objects in the heap.

Figure 6:
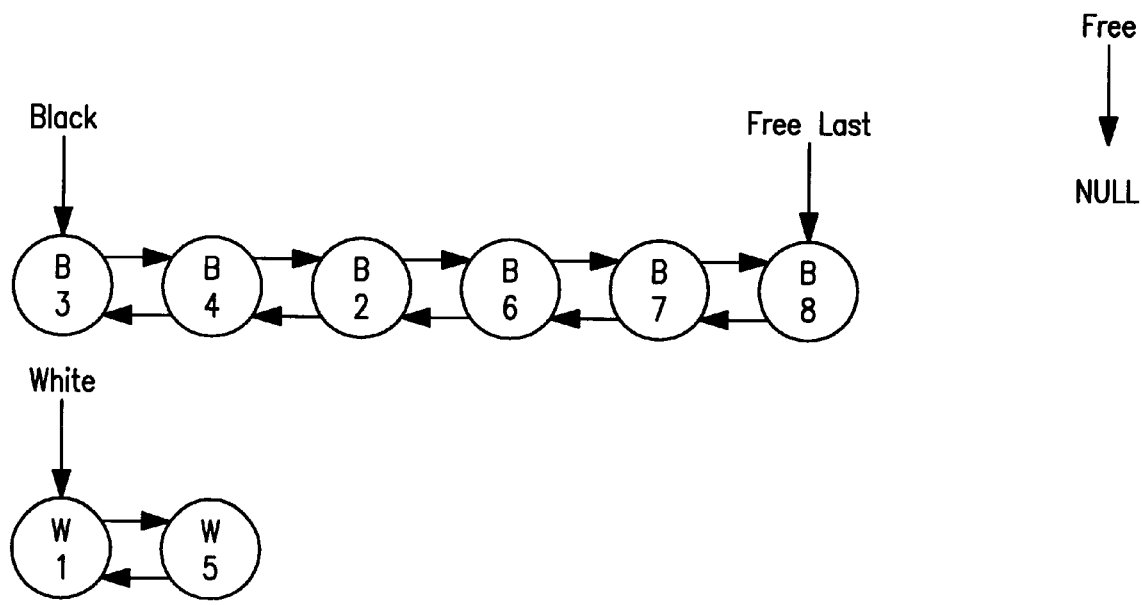
FIG. 6 depicts the same simple example, but after further scanning has been done in accordance with the present invention.

When the Gray list pointer and the Black list pointer are equal, there are no more Gray objects, as shown in FIG. 6. At this point, traversal is complete: all accessible, live objects have been marked Black, while everything else (in this case, objects 1 and 5) remains White, and may safely be regarded as garbage to be made available for recycling. In order to recycle these garbage objects, each object in the White list should have its color set to Green, assuming that a "conservative" collection scheme is being employed, as is well known in the art. Non-conservative collectors may omit the Green coloring. In either case, the data object at the head of the White list is then appended to the end of the Free list at step 78, and is thereby made available for reuse. This completes the GC cycle.

Note that this technique has been described in terms of multiple threads running on one or more processors, but all associated with a single address space. If multiple address spaces are used in the target environment, then the present method may simply be repeatedly applied in the same way to each address space, as will be evident to those of skill in the art.

Concurrently Executing the Mutators and Collector, Using a Write Barrier

We have explained that after the initial work involved in steps 60 through 66 and part of step 68 is done, mutator execution may proceed concurrently with the remaining work of the garbage collection cycle. However, an additional precaution is necessary to prevent mutators from transferring pointer information in ways that inadvertently fool the garbage collector into wrongly characterizing an object as garbage. Briefly, the potential problem may be illustrated as follows. Suppose that the pointer to a particular White object in the heap is, at the start of a new GC cycle, only stored in a single, live object. Suppose further that sometime during the cycle, a mutator overwrites that pointer, but copies it first into another data object. Suppose further that this other data object—which is now the sole live route for accessing the White object on the heap—has already been fully traced and marked Black by the garbage collector at this point. In this scenario, a problem arises because the White heap object is still accessible and is not truly garbage, but the garbage collector will never find any path to it during this cycle, and will therefore ultimately mischaracterize it as garbage. This problem is well known in the art, as is the solution of employing a so-called "write barrier." For the present invention, a write barrier of the "snapshot-at-beginning" variety known in the art is preferably used, although, as explained further below, the manner of applying the write barrier in accordance with the present invention is novel in certain very important respects.

Figure 7:
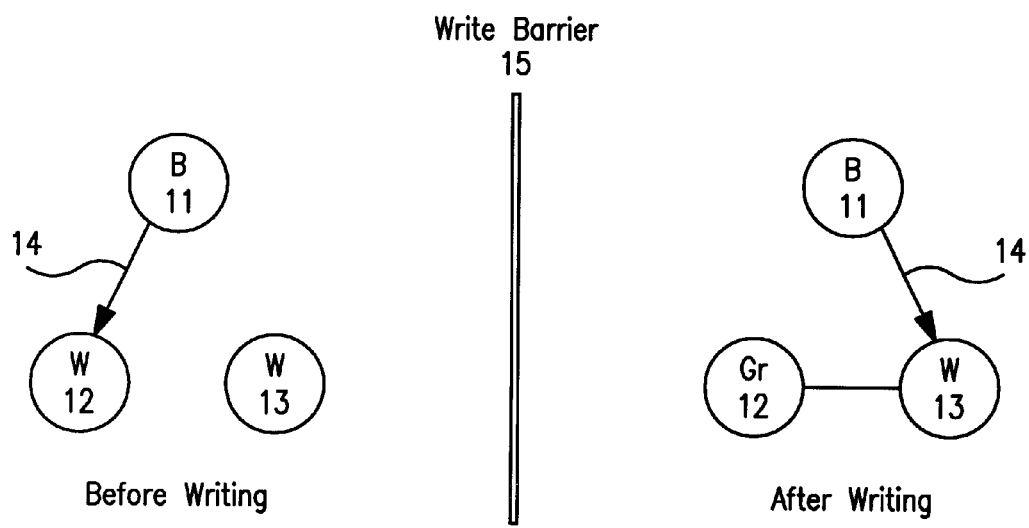
FIG. 7 illustrates the use of a write barrier.

Basically, such a write barrier is intended to ensure that all objects which are live as of the instant a new GC cycle begins will be successfully traced and retained by the garbage collector. The write-barrier is preferably applied only to code running on a mutator thread. Any pointer writes into the heap or the global data section must go through the write barrier. The write barrier works by examining the pointer that is about to be overwritten. If the pointer which is about to be overwritten points at a White object in the heap, then that object must be made Gray. For example, as shown in FIG. 7, the color of object 12 is changed from White to gray by write barrier 15, before pointer 14 is overwritten. The change to Gray may be done immediately, or it may be done lazily by saving a copy of the pointer in a list and allowing the GC to examine the pointer at some point before the current collection is complete. If immediate Graying is chosen, and the invention is being practiced in a multi-processor environment, then it is further necessary to prevent different threads from simultaneously modifying the Gray list, in order to avoid possible corruption of the list. This protection may easily be achieved by means of a mutex lock, as will be evident to one of ordinary skill in the art. Write barrier 15 may be implemented by modifying a compiler applied to the mutators, so as to invoke a suitable routine wherever pointer overwrites are attempted. Alternately, calls to a routine may be manually inserted; a simple parser may be implemented by one of ordinary skill to flag potential pointer overwrites. In any case, write barrier 15 ensures that all objects which are live at the start of a collection cycle will be made Black by the collector sometime during that cycle.

Note that the write barrier preferably need not be used with respect to modification of the initial pointer values in a newly created object, since all new objects are preferably initialized with a special value such as NULL when first allocated, and NULL cannot possibly point at a White object in the heap.

An important aspect of the present invention is that modifications of pointers stored as part of the thread state—i.e., in the thread stack or registers—are preferably not made subject to write barrier 15. This exception can safely be made, because the present invention always saves thread state information during the initial phase of each GC cycle, before any mutators can possibly alter the thread state; thus, all objects references from within the thread state areas will have been preserved. Therefore, once the mutator threads have been scanned during the beginning of a new collection cycle, they need not be examined again during that cycle, nor need they be made subject to write barrier 15.

The result of applying write barrier 15 in this manner is dramatic. In practice, most mutator modification is done with respect to the thread state, as opposed to other data. Even more importantly, thread state modification typically involves fast, register-type access and avoids the overhead of main memory access. Application of the write barrier, of course, necessarily introduces main memory access each time, since the pointer being modified must be traced into the heap. Consequently, applying the write barrier to modification of thread state pointers, as has been conventional in the prior art, necessarily introduces severe performance penalties. These penalties are themselves a further reason why prior art garbage collection systems have been unable to satisfactorily service real-time multimedia applications and systems. The present invention, as explained, is free of such prohibitive penalties.

Source code created by the author for use in implementing the present invention in the C programming language is included below for purposes of further illustration of a preferred embodiment.

```
mem-config.h                                                                    Page 1
Wednesday, May    , 1994  5:27 PM /* Memory management configuration for the mac */ ifndef _mem_config_h_
define _mem_config_h_

/* Basic parameters */
#define MAX_HEAP_SEGMENTS 500
#define MAX_STATIC_SEGMENTS 1
#define MAX_SEGMENTS MAX_HEAP_SEGMENTS + MAX_STATIC_SEGMENTS
/* These are used if we can have multiple heap segments */
#define DEFAULT_FIRST_HEAP_SEGMENT_SIZE 1170000
define DEFAULT_HEAP_SEGMENT_SIZE 1 << 18 define DEFAULT_FIRST_STATIC_SEGMENT_SIZE 350000
define DEFAULT_STATIC_SEGMENT_SIZE 0                    /* only 1 static segment for now *

/* These are used if we can only have a single heap segment */
#define BASE_SYSTEM_MEMORY DEFAULT_FIRST_HEAP_SEGMENT_SIZE + DEFAULT_FIRST_STATIC_SEGM
define SYSTEM_TO_HEAP_RATIO 0.08 define ENABLE_DEALLOCATION 0
define ENABLE_NOPOINTERS 1
#define ENABLE_SELECTIVE_SETF 0
#define ENABLE_EXPLICIT_GLOBAL_ROOTS 0
#define GC_MSGS 0
#define GC_DEBUG_MSGS 0
#define GC_ASAP 0
#define CHECK_BASH 0
#define CHECK_SETFINIT 1
#define TRACE_MEM_USAGE 1
define MAX_TRACE_METAS 256 define GC_POINTER_ALIGNMENT 2
define PAGE_POWER 10
#define NUM_REGISTERS 32
#define THREAD_LIMIT 100
#define DEFAULT_GC_INCREMENT 20 /* in milliseconds */
define INTERIOR_PTR_RETENTION_LIMIT 512 typedef SXlong tock_type;
define CPU_TOCKS(tr) (K_MicroSeconds(&(tr)));
#define SECONDS_PER_TOCK 1E-6
#define ELAPSED_MILLISECONDS(start, delta) { tock_type end; CPU_TOCKS(end); \
                                             delta = (end.lo - start.lo) / 1000.0; }
#define START_CODE_TIMING { tock_type start_tocks; double time; CPU_TOCKS(start_tocks)
define END_CODE_TIMING(total) ELAPSED_MILLISECONDS(start_tocks, time); total = total define ENABLE_VISUAL_MEMORY 1
define VISUAL_MEMORY_ON (ENABLE_VISUAL_MEMORY && visual_memory_on)
#define VISUAL_MEMORY_DEFAULT_ON 0
#define UPDATE_VISUAL_STATE() { if (VISUAL_MEMORY_ON) { SXdraw_visual_gc_state(); }}
#define ENABLE_GC_TIMING 1
```

- 16 - mem-config.h
Wednesday, May    1994  5:27 PM                                                          Page 2

```
define ENABLE_REALLOC_COUNT 0 define DETECT_INVALID_REFS 0
define TRACE_BOOT_MEM_USAGE 0

/* oic.c and StartScriptX.c use this...move it somewhere else */
#if TRACE_BOOT_MEM_USAGE
#    define traceMem(label) SXsnapMemoryTrace(((SXobject) label))
#else
#    define traceMem(label)
endif endif
``` infoBits.h                                                                                                    Page 1
Thursday, March 24, 1994 5:38 PM

```c
/* infoBits.h */ ifndef _infoBits_h_
define _infoBits_h_

/* Links are divided into a pointer and some low order info bits.
   We could store object group indices in the info bits
   if we wanted to for speed. */

/* General macros/data */ typedef struct gc_header {
  struct gc_header * prev;
  struct gc_header * next;
} GC_HEADER;

typedef GC_HEADER * GCPTR;

typedef struct gcmd_header {
    struct gc_header * prev;
    struct gc_header * next;
    void * metadata;
} GCMD_HEADER;

typedef GCMD_HEADER * GCMDPTR;

#define LINK_INFO_BITS 4
#define LINK_INFO_MASK ((1 << LINK_INFO_BITS) - 1)
#define LINK_POINTER_MASK (~LINK_INFO_MASK)

#define GET_LINK_POINTER(l) ((GCPTR) (((int) (l)) & LINK_POINTER_MASK))
define SET_LINK_POINTER(l,value) (SXbeerBash (l, (GCPTR) (((int) (l) & LINK_INFO_MASK define GET_LINK_INFO(l,mask) ((int) l & (mask))
define SET_LINK_INFO(l,mask,bits) (SXbeerBash (l, (GCPTR) (((int) l & ~(mask)) | bits /* GC info bits
 *  anybody defining new bits had better initialize them in rtmem:SXinitializeObject()
 *  unless of course you're implementing the "random" object :-)
 */ define GC_STORAGE_INFO_MASK (0x3)
define GC_COLOR_INFO_MASK (0x3)

#define GET_STORAGE_CLASS(p) (GET_LINK_INFO(p->next,GC_STORAGE_INFO_MASK))
define SET_STORAGE_CLASS(p,SXclass) (SET_LINK_INFO(p->next,GC_STORAGE_INFO_MASK,SXcla define GET_INSTANCE_STORAGE_CLASS(o) (GET_LINK_INFO(((GCPTR) ((char *) (o) - sizeof(G
define SET_INSTANCE_STORAGE_CLASS(o,SXclass) (SET_LINK_INFO(((GCPTR) ((char *) (o) -
``` infoBits.h
Thursday, March  , 1994  5:38 PM

```
#define GET_COLOR(p)      (GET_LINK_INFO(p->prev,GC_COLOR_INFO_MASK))
#define SET_COLOR(p,color) (SET_LINK_INFO(p->prev,GC_COLOR_INFO_MASK,color))

#define SC_NOPOINTERS    0
#define SC_POINTERS      1
#define SC_METADATA      2
define SC_INSTANCE      3 define GENERATION0    0
define GENERATION1    1
#define GRAY           2
define GREEN          3     /* Could use GREEN=GRAY, but we've got room */ define WHITEP(p)  (GET_COLOR(p) == unmarked_color)
define BLACKP(p)  (GET_COLOR(p) == marked_color)
#define GRAYP(p)   (GET_COLOR(p) == GRAY)
#define GREENP(p)  (GET_COLOR(p) == GREEN)

/* Proxy info bits */
#define PROXY_INFO_MASK (0x4)

#define GET_PROXY_INFO(o)     (GET_LINK_INFO(((GCPTR) ((char *) (o) - sizeof(GC_HEADER
#define SET_PROXY_INFO(o,bit) (SET_LINK_INFO(((GCPTR) ((char *) (o) - sizeof(GC_HEADER
#define PROXYP(o)             (GET_PROXY_INFO(o))

#endif /* whole file */
```

```
mem-internals.                                                          Page 1
Monday, May 23, 1994  5:34 PM ifndef _mem_internals_h_
define _mem_internals_h_ include _f_mem_config_h_
include "infoBits.h"

#if (OS == WINDOWS_OS)
#include "mdclocks.h"
#endif

/* Other parts of the system like to use IN_HEAP and IN_GLOBALS */
#define EMPTY_PAGE    ((GPTR) 0)
#define SYSTEM_PAGE   ((GPTR) 1)
#define STATIC_PAGE   ((GPTR) 2)
#define EXTERNAL_PAGE ((GPTR) 3)

#define HEAP_SEGMENT 0
define STATIC_SEGMENT 1 define BYTES_PER_PAGE (1 << PAGE_POWER)
define PAGE_ALIGNMENT_MASK (BYTES_PER_PAGE - 1)

#define PTR_TO_PAGE_INDEX(ptr) ((int) (((BPTR) ptr - first_partition_ptr) >> PAGE_POWE
#define PAGE_INDEX_TO_PTR(page_index) (first_partition_ptr + ((page_index) << PAGE_POW
#define PTR_TO_GROUP(ptr) pages[PTR_TO_PAGE_INDEX(ptr)].group
#define IN_PARTITION(ptr) (((BPTR) ptr >= first_partition_ptr) && ((BPTR) ptr < last_p
#define PAGE_GROUP(ptr) (IN_PARTITION(ptr) ? PTR_TO_GROUP(ptr) : EXTERNAL_PAGE)
#define IN_HEAP(ptr) ((int) PAGE_GROUP(ptr) > (int) EXTERNAL_PAGE)
#define IN_STATIC(ptr) (((BPTR) ptr >= first_static_ptr) && ((BPTR) ptr < last_static_
#define IN_HEAP_OR_STATIC(ptr) (IN_HEAP(ptr) || IN_STATIC(ptr))
#define IN_GLOBALS(ptr) ( (((BPTR) ptr >= first_globals_ptr) && ((BPTR) ptr < last_glo
#define ROUND_DOWN_TO_PAGE(ptr)  ((BPTR) (((int) ptr & ~PAGE_ALIGNMENT_MASK)) )
#define ROUND_UP_TO_PAGE(ptr) (ROUND_DOWN_TO_PAGE(ptr) + BYTES_PER_PAGE)

typedef unsigned long * LPTR;
typedef unsigned char * BPTR;

extern BPTR first_partition_ptr; /* First heap object will always be scanned! */
extern BPTR last_partition_ptr;
extern BPTR first_static_ptr;
extern BPTR last_static_ptr;
extern BPTR first_globals_ptr;
extern BPTR last_globals_ptr;
extern BPTR first_globals_ptr2;
extern BPTR last_globals_ptr2;
#define MIN_GROUP_INDEX 4   /* yields min 16byte objects */
#define MAX_GROUP_INDEX 22  /* yields max 4meg objects */
#define MIN_GROUP_SIZE (1 << MIN_GROUP_INDEX)
#define MAX_GROUP_SIZE (1 << MAX_GROUP_INDEX)
#define NUMBER_OF_GROUPS (MAX_GROUP_INDEX - MIN_GROUP_INDEX + 1)
#define MIN_OBJECT_ALIGNMENT (MIN_GROUP_SIZE - 1)
#define INSTANCE_TO_GCPTR(ptr) ((GCPTR) ((BPTR) ptr - sizeof(GC_HEADER)))
``` mem-internals.h                                                                  Page 2
Monday, May 23, 1994 5:34 PM

```
#define HEAP_OBJECT_TO_GCPTR(ptr) ((GCPTR) ((int) ptr & ~MIN_OBJECT_ALIGNMENT))
#define DOUBLE_ALIGNMENT (sizeof(double) - 1)
#define DOUBLE_ALIGNED_P(p) ((int) p == (((int) p) && ~DOUBLE_ALIGNMENT))
#define LONG_ALIGNMENT (sizeof(long) - 1)
#define ROUND_UPTO_LONG_ALIGNMENT(n) ((((n) - 1)) & ~LONG_ALIGNMENT) + sizeof(long))
/* HEY! This is a pretty stupid definition. Something better?
#define METADATAP(p) (IN_GLOBALS(p) || !(isObj(p))) */

/* HEY! This is still pretty dumb, but better... */
#define CLASSP(ptr) (IN_HEAP_OR_STATIC(ptr) && (GET_INSTANCE_STORAGE_CLASS(ptr) == SC_
#define METADATAP(ptr) (!(CLASSP(ptr)))

#if (OS == MAC_OS)
#define MAYBE_PAUSE_GC if ((pause_gc_flag != 0) && (pause_ok_flag != 0)) { SXpause_gc(
#elif (OS == WINDOWS_OS)
#define MAYBE_PAUSE_GC if ((tgtTime <= SXgetMDClockCounter()) && (pause_ok_flag != 0))
endif define MAYBE_SLEEP_GC if (total_allocation_this_cycle == 0) SXsleep_gc();
define MAYBE_AWAKEN_GC if (gc_sleeping) SXawaken_gc();

#define MIN(x,y) ((x < y) ? x : y)
#define MAX(x,y) ((x > y) ? x : y)
define SWAP(x,y) {int tmp; tmp = x; x = y; y = tmp;} typedef struct group_info {
  int size;
  int index;

GCPTR free;
  GCPTR free_last;
  GCPTR white;
  GCPTR black;
  GCPTR gray;

int total_object_count;
  int white_count;
  int black_count;
  int green_count;
} GROUP_INFO;

typedef GROUP_INFO * GPTR;

typedef struct segment {
    BPTR first_segment_ptr;
    BPTR last_segment_ptr;
    int segment_page_count;
    int type;
} SEGMENT;

typedef struct hole {
    int page_count;
    struct hole *next;
```

```
mem-internals.Y                                                                Page 3
Monday, May 23, 1994  5:34 PM

} HOLE;

typedef HOLE * HOLE_PTR;

typedef struct page_info {
    GCPTR base;
    GPTR group;
    int bytes_used;
} PAGE_INFO;

typedef PAGE_INFO * PPTR;

typedef struct thread_info {
    SXobject thread;
} THREAD_INFO;

typedef THREAD_INFO * TPTR;

/* ANSI C lossage...*/
void scan_gray_set();
void scan_globals();
void flip();
void scan_memory_segment(BPTR low, BPTR high);
void scan_object(GCPTR ptr, int total_size);
void pause_gc();
void awaken_gc();
void *big_malloc(int size);
GCPTR interior_to_gcptr(BPTR ptr);
void SXinit_empty_pages(int first_page, int page_count, int type);

char * SXobject_color_to_string(GCPTR color);
char * SXstorage_class_to_string(int storage_class);
extern void SXverify_total_object_count(void);
void SXverify_header(GCPTR ptr);
void SXverify_group(GPTR group);
void SXverify_all_groups(void);
int SXprint_object_info(GCPTR ptr, int i);
void SXprint_page_info(int page_index);
void SXprint_group_info(GPTR group);
void SXprint_memory_summary(void);
SXobject SXfindParents(SXobject address);

void gcDefStackBase(void);
void SXaddMarkRegion(int kind, void *from, void *to);
void SXaddMarkRegion2(int kind, void *from, void *to);
void SXinit_global_bounds(void);
void GlobalsMarkRegion(void);
SXint SXreal_isobj(void *ptr);
SXint SXallocationTrueSize(void * metadata, SXint size);
SXint SXtrueSize(void *ptr);
void SXawaken_gc(void);
void SXpause_gc(void);
``` mem-internals.?  
Monday, May 23, 1994 5:34 PM

```
void SXsleep_gc(void);
void SXrestart_gc(void);
void SXinit_heap(int default_heap_bytes, int static_size, BPTR first_partition_ptr, BP
void SXinit_realtime_gc(void);
void scan_memory_segment(BPTR low, BPTR high);
int SXmake_object_gray(GCPTR current, BPTR raw);

#if TRACE_MEM_USAGE
    void SXtrace_allocate(void *metadata, SXint request_size, SXint used_size);
    void SXtrace_staticAllocate(void *metadata, SXint request_size, SXint used_size);
endif void machine_specific_init_heap(void);
void clearGCSniff(SXobject thread);
void * SXbig_malloc(int size);
void SXcopy_regs_to_stack(BPTR regptr);

SXobject SXmakeMDVisualDebugger(SXobject x,SXobject y,SXobject defaultWidth,SXobject d
    SXobject visible);
int SXupdate_visual_page(int page_number);
void SXmaybe_update_visual_page(int page_number, int old_bytes_used, int new_bytes_use
void SXupdate_visual_static_page(int page_number);
void SXupdate_visual_fake_ptr_page(int page_index);
void SXdraw_visual_gc_state(void);
void SXdraw_visual_gc_stats(void);
void SXvisual_runbar_on(void);
void SXvisual_runbar_off(void);

void SXinit_visual_memory(void);
void SXmousedown_in_visual_memory_window(SXint width, SXint height, short modifiers );
void SXmouseup_in_visual_memory_window(SXint width, SXint height, short modifiers);
void SXrefresh_visual_memory_window(void);
void SXtoggle_visual_memory(void);
void SXterminate_visual_memory(void);
void out_of_memory(char *space_name, int size);

extern GROUP_INFO *groups;
extern PAGE_INFO *pages;
extern THREAD_INFO *threads;

extern int next_thread; /* HEY! get rid of this... */ extern SXobject gc_thread;
extern int gc_count;
extern int gc_increment;
extern int visual_memory_on;

extern SEGMENT *segments;
extern int total_segments;
extern int ok_to_gc_in_growzone;
extern int heap_kbytes;
``` mem-internals.h
Monday, May 23, 1994 5:34 PM
Page 5

```
extern int total_partition_pages;
extern int memory_mutex;
extern int gc_sleeping;
extern int gc_count;
extern int work_todo;
extern int unmarked_color;
extern int marked_color;
extern int enable_gc;
extern int enable_write_barrier;
extern int tracing_mem_usage;

extern int total_allocation;
extern int total_requested_allocation;
extern int total_requested_objects;
extern int total_allocation_this_cycle;
extern double total_viz_mem_time_in_increment;

extern char *last_gc_state;
extern double last_cycle_ms;
extern double last_gc_ms;
extern int last_increments;
extern double last_max_increment_ms;
extern double last_write_barrier_ms;

extern SXbool SXstartingScriptX;
void set_gc_pause_flag (void);

#endif
``` allocate.h                                                                                    Page 1
Wednesday, May   1994  6:58 PM

```c
/* Interface to the memory manager. */ ifndef _allocate_h_
define _allocate_h_ define ENABLE_REALTIME_GC 1

/* Predefined Metadata */
#define SXpointers      ((void *) 0)
#define SXnopointers    ((void *) 1)

extern void * SXwrite_barrier(int * lhs_address, int rhs);

extern void * SXsafe_bash(int * lhs_address, int rhs);

extern void * SXsafe_setfInit(int * lhs_address, int rhs);

extern void * SXallocate(void * metadata, SXint number_of_bytes);

extern void * SXstaticAllocate(void * metadata, SXint number_of_bytes);

extern void * SXreallocate(void *pointer, SXint new_size);

extern void SXdeallocate(void *pointer);

extern void * ptrcpy(void * p1, void * p2, int num_bytes);

extern void * ptrset(void * p1, int data, int num_bytes);

extern SXobject SXgc(void);

extern SXobject SXmemUsage(void);

extern SXobject SXmemHighTide(void);

extern SXobject SXtotalFreeHeapSpace(void);

extern SXobject SXlargestFreeHeapBlock(void);

extern SXobject SXtotalFreeSystemSpace(void);

extern SXobject SXlargestFreeSystemBlock(void);

extern SXobject SXsetGcIncrement(SXobject inc);

extern SXobject SXfindParents(SXobject address);

extern SXint SXforEachInstance(SXobject class, void (* func)(SXobject));

extern void SXstart_gc(void);

void SXcancel_gc_pause_callback(void);
``` allocate.h  
Wednesday, May  1994  6:58 PM

```c
void SXscan_thread(SXobject thread);

void SXset_gc_pause_flag(void);

extern int enable_gc;

extern SXint SXstackAllocationSize(void * metadata, SXint size);

extern SXint SXallocationTrueSize(void * metadata, SXint size);

extern SXint SXtrueSize(void *ptr);

extern void * SXinitializeObject(void * metadata, void *base, int total_size, int real extern void SXstartMemoryTracing(void);

extern void SXstopMemoryTracing(void);

extern void SXprintMemoryTrace(SXobject label);

extern void SXsnapMemoryTrace(SXobject label);

#if (COMPILER == THINKC)
#define STACK_ALLOC_LOSSAGE(size,result)    move.l   size, d0      \
                                            neg.l    d0            \
                                            add.l    sp, d0        \
                                            moveq.l  #-4, d1       \
                                            and.l    d1, d0        \
                                            move.l   d0, sp        \
                                            move.l   d0, result define SXalloca(size,result) asm{ STACK_ALLOC_LOSSAGE(size,result) } define SAVE_STACK_LOSSAGE(height)       move.l  sp, height
define RESTORE_STACK_LOSSAGE(height)    move.l  height, sp
#define SXsaveStack(height) asm{ SAVE_STACK_LOSSAGE(height) }
#define SXrestoreStack(height) asm{ RESTORE_STACK_LOSSAGE(height) }
endif if (COMPILER == WATCOM_DOS)
include <malloc.h>
#define SXsaveStack(height)
#define SXrestoreStack(height)
#define SXalloca(size,result) result = alloca(size);
endif if (COMPILER == XLC)
define SXalloca(size, result) result = (void*)alloca(size);
#define SXsaveStack(height)
#define SXrestoreStack(height)
#endif
``` allocate.h
Wednesday, May `_, 1994   6:58 PM                                                                          Page 3

```
/* Hope introducing a new scope doesn't change the stack height! */
#define SXXstackAllocate(metadata, size, base) \
    { int real_size = SXstackAllocationSize(metadata, size); \
    SXalloca(real_size, base); \
    base = SXinitializeObject(metadata, base, real_size, real_size); } endif define INVALID_ADDRESS 0xEF include _f_writebarrier_h_
```

```
rtgc.c                                                                  Page 1
Wednesday, June _, 1994  4:47 PM /* Real time Storage garbage collector running on its own thread

* History (Most recent first):    $Log: rtgc.c,v $
 * Revision 1.4  1994/05/19  01:26:55  wade
 * Montery fixes
 *
 * Revision 1.3  1994/05/06  22:00:11  tidwell
 * changes to clocks for title support
 *
 * Revision 1.2  1994/05/05  16:47:10  sobrino
 * Fix Windows compiler errors.
 *
 * Revision 1.1  1994/05/05  02:57:55  wade
 * memory reorg + misc fixes
 *
 * Revision 1.114  1994/04/28  18:09:08  clayton
 * Beta changes made in main branch (nop setgcincrement() for Windows)
 *
 * $End_of_Log$
 *
 */ include "gdefs.h"
include "oic.h"

/* Conditionally include this *entire* file */
if ENABLE_REALTIME_GC include _f_mem_config_h_ define THREAD_CALLBACK
include <assert.h> include _f_mem_internals_h_
include _f_clockProtocols_h_
#include _f_KFixedMath_h_
#include _f_threadSystem_h_
#include "priority.h"
#include "metadata.h"

/* Global GC variables follow. We do NOT want GC info containing
   heap pointers in the global data section, or the GC will
   mistake them for mutator pointers and save them! Hence, we
   malloc some structures. */
#if (OS == WINDOWS_OS)
#include "mdclocks.h"
SXint tgtTime;                    /* Tgt time for GC pause */
endif THREAD_INFO *threads;

int gc_sleeping;
int gc_count;
```

```
rtgc.c                                                                    Page 2
Wednesday, June  ., 1994  4:47 PM int next_thread; /* HEY! get rid of this... */ int pause_gc_flag;
    int pause_ok_flag;
    int run_to_completion_without_pausing;

SXobject thread_awaiting_complete_gc;
    double total_gc_time_in_cycle;
    double max_increment_in_cycle;
    double total_viz_mem_time_in_increment;
    double total_write_barrier_time_in_cycle;
    tock_type start_gc_cycle_tocks;
    tock_type start_gc_increment_tocks;

int gc_done;
    int increment_count;
    int gc_increment; /* milliseconds */
    SXobject gc_thread;
    SXobject gc_thread_clock;
    SXobject gc_thread_callback;
    SXobject gc_thread_condition;
    SXobject gc_clock;
    SXobject gc_callback;

double last_cycle_ms = 1;
    double last_gc_ms = 0;
    int last_increments = 0;
    double last_max_increment_ms = 0;
    double last_write_barrier_ms = 0;
    char *last_gc_state;

static
    void remove_object_from_free_list(GPTR group, GCPTR object)
    {
        GCPTR prev, next;

prev = GET_LINK_POINTER(object->prev);
        next = GET_LINK_POINTER(object->next);

if (object == group->free) {
            group->free = next;
        }
        if (object == group->black) {
            group->black = next;
        } if (object == group->free_last) {
            group->free_last = ((next == NULL) ? prev : next);
        } if (prev != NULL) {
            SET_LINK_POINTER(prev->next,next);
        }
```

```
rtgc.c                                                                    Page 3
Wednesday, June 1, 1994  4:47 PM if (next != NULL) {
        SET_LINK_POINTER(next->prev,prev);
    } group->green_count = group->green_count - 1;
    group->total_object_count = group->total_object_count - 1;
} static
void convert_free_to_empty_pages(int first_page, int page_count)
{
    int next_page_index = first_page;
    int end_page = first_page + page_count;
    HOLE_PTR new;

/* Remove objects on pages from their respective free lists */
    while (next_page_index < end_page) {
        GPTR group = pages[next_page_index].group;
        int total_pages = MAX(1,group->size / BYTES_PER_PAGE);
        int object_count = (total_pages * BYTES_PER_PAGE) / group->size;
        int i;
        GCPTR next;

next = (GCPTR) PAGE_INDEX_TO_PTR(next_page_index);
        for (i = 0; i < object_count; i++) {
            remove_object_from_free_list(group, next);
            next = (GCPTR) ((BPTR) next + group->size);
        }
        next_page_index = next_page_index + total_pages;
    }

SXinit_empty_pages(first_page, page_count, HEAP_SEGMENT);
} static
void coalesce_segment_free_pages(segment)
{
    int next_page_index, first_page_index, last_page_index, contig_count;

first_page_index = -1;
    contig_count = 0;
    next_page_index = PTR_TO_PAGE_INDEX(segments[segment].first_segment_ptr);
    last_page_index = PTR_TO_PAGE_INDEX(segments[segment].last_segment_ptr);
    while (next_page_index < last_page_index) {
        GPTR group = pages[next_page_index].group;
        int total_pages = (group > (GPTR) 0) ? MAX(1,group->size / BYTES_PER_PAGE) : 1
        int count_free_page = (group != EMPTY_PAGE) &&
                              (pages[next_page_index].bytes_used == 0);
        if (count_free_page) {
            if (first_page_index == -1) {
                first_page_index = next_page_index;
            }
            contig_count = contig_count + total_pages;
```

```
rtgc.c                                                                    Page 4
Wednesday, June  , 1994 4:47 PM }
            next_page_index = next_page_index + total_pages;
            if ((!count_free_page || next_page_index == last_page_index) &&
                (first_page_index != -1)) {
                    convert_free_to_empty_pages(first_page_index, contig_count);
                    first_page_index = -1;
                    contig_count = 0;
            }
        }
    } static
    void coalesce_all_free_pages()
    {
        int segment;

for (segment = 0; segment < total_segments; segment++) {
            /* HEY! Put a MAYBE_PAUSE here */
            if (segments[segment].type == HEAP_SEGMENT) {
                coalesce_segment_free_pages(segment);
            }
        }
    }

/* HEY! pass in group info! */
    static
    int SXmake_object_gray(GCPTR current, BPTR raw)
    {
        GCPTR prev;
        GCPTR next;
        GCPTR black;
        GCPTR gray;
        GPTR group = PTR_TO_GROUP(current);
        BPTR header = (BPTR) current + sizeof(GC_HEADER);

/* Only allow interior pointers to retain objects <= 1 page in size */
        if ((group->size <= INTERIOR_PTR_RETENTION_LIMIT) ||
            (((int) raw) == -1) || (raw == header)) {
            prev = GET_LINK_POINTER(current->prev);
            next = GET_LINK_POINTER(current->next);

/* Remove current from WHITE space */
            if (current == group->white) {
                group->white = next;
            }
            if (prev != NULL) {
                SET_LINK_POINTER(prev->next,next);
            }
            if (next != NULL) {
                SET_LINK_POINTER(next->prev,prev);
            }

/* Link current onto the end of the gray set. This gives us a breadth
```

```
                    first search when scanning the gray set (not that it matters). */
                SET_LINK_POINTER(current->prev,NULL);
                gray = group->gray;
                if (gray == NULL) {
                    SET_LINK_POINTER(current->next,group->black);
                    if (group->black == NULL) {
                        group->black = current;
                        group->free_last = current;
                    } else {
                        SET_LINK_POINTER((group->black)->prev,current);
                    }
                } else {
                    SET_LINK_POINTER(current->next, gray);
                    SET_LINK_POINTER(gray->prev,current);
                }
                SET_COLOR(current,GRAY);
                group->gray = current;
                group->white_count = group->white_count - 1;
            }
            return(group->size);
    }

/* Scan memory looking for *possible* pointers */
    void scan_memory_segment(BPTR low, BPTR high)
    {
        BPTR next;
        BPTR ptr;
        GCPTR gcptr;
        int page_index;
        GPTR group;
        int len;

len = high - low;
        /* if GC_POINTER_ALIGNMENT is < 4, avoid scanning potential pointers that
           extend past the end of this object */
        high = high - sizeof(LPTR) + 1;
        next = low;
        for (next = low; next < high; next = next + GC_POINTER_ALIGNMENT) {
            MAYBE_PAUSE_GC;
            ptr = *((BPTR *) next);
            if (IN_PARTITION(ptr)) {
                page_index = PTR_TO_PAGE_INDEX(ptr);
                group = pages[page_index].group;
                if (group > EXTERNAL_PAGE) {
                    gcptr = interior_to_gcptr(ptr); /* Map it ourselves here! */
                    if WHITEP(gcptr) {
                        SXmake_object_gray(gcptr, ptr); /* Pass in group info! */
                    }
                } else {
                    if (VISUAL_MEMORY_ON && (group == EMPTY_PAGE)) {
                        SXupdate_visual_fake_ptr_page(page_index);
                    }
```

```
            }
         }
      }
} include _f_ObjStoreProtocol_h_ typedef struct metadata_list {
    struct metadata_list *next;
    MetaDataPtr metadata;
} metadata_list;

void walk_metadata(MetaDataPtr metadata, metadata_list *seen);

static walk_metadata_basictype(MetaDataBasicType *metadata, metadata_list *seen)
{
    char *s;

switch (metadata->basicType) {
    case voidType: s = "void"; break;
    case SXcharType: s = "char"; break;
    case SXshortType: s = "short"; break;
    case SXintType: s = "int"; break;
    case SXfloatType: s = "float"; break;
    case SXdoubleType: s = "double"; break;
    case objType: s = "?????????????????obj type?"; break;
    case functionType: s = "function ptr"; break;
    default: Debugger();
    }
    printf("Basic Type: %s\n",s);
} static void walk_metadata_definedtype(MetaDataDefinedType *metadata, metadata_list *se
{
    resolveTypeDefinition(metadata);
    printf("    Defined Type %s", metadata->typeName);
    walk_metadata(metadata->type, seen);
} static void walk_metadata_pointer(MetaDataPointer *metadata, metadata_list *seen)
{
    printf("    Pointer to ");
    walk_metadata(metadata->pointerRef, seen);
    /* We could check that metadata matches the actual object's md */
} static void walk_metadata_vector(MetaDataVector *metadata, metadata_list *seen)
{
    int size;

printf("    Vector of ");
    walk_metadata(metadata->vectorContents, seen);
```

- 33 -

```
rtgc.c                                                                                      Page 7
Wednesday, June 1, 1994 4:47 PM if ((metadata->metadata.typeFlags) &  VECTOR_VAR_LENGTH) {
        printf("YOW! A var length vector...\n");
        size = 0; /* (metadata->nElements)(base_of_enclosing_structure, ptr_to_vector_
    } else {
        size = (int) metadata->nElements;
    }
} static void walk_metadata_structure_element(StructureElement *element, metadata_list *
{
    printf("   field name = %s, offset = %d ", element->fieldName, element->structEle
    walk_metadata(element->structElementType, seen);
} static void walk_metadata_structure(MetaDataStructure *metadata, metadata_list *seen)
{
    int i;

printf("   Structure of {\n");
    for (i = 0; i < metadata->nElements; i++) {
        walk_metadata_structure_element(&(metadata->structureContents[i]), seen);
    }
    printf("}\n");
} static void walk_metadata_union(MetaDataUnion *metadata, metadata_list *seen)
{
    printf("YOW! A union...\n");
} static void walk_metadata_custom(MetaDataCustom *metadata, metadata_list *seen)
{
    printf("   Custom metadata \n");
    walk_metadata(metadata->type, seen);
} void walk_metadata(MetaDataPtr metadata, metadata_list *seen)
{
    metadata_list record, *next;
    void (*f)(void *, void *);
    int cyclep;

record.next = seen;
    record.metadata = metadata;
    next = seen;
    cyclep = 0;
    while (next != 0) {
        if (next->metadata == metadata) {
            cyclep = 1;
            next = 0;
        } else {
            next = next->next;
        }
```

```
    }
    if (!cyclep) {
        switch(metadata->typeFlags & METADATA_TYPE_MASK) {
        case METADATA_BASIC_TYPE: f = (void (*)(void *, void *)) walk_metadata_basicty
        case METADATA_DEFINED_TYPE: f = (void (*)(void *, void *)) walk_metadata_defin
        case METADATA_POINTER: f = (void (*)(void *, void *)) walk_metadata_pointer; b
        case METADATA_VECTOR: f = (void (*)(void *, void *)) walk_metadata_vector; bre
        case METADATA_STRUCTURE: f = (void (*)(void *, void *)) walk_metadata_structur
        case METADATA_UNION: f = (void (*)(void *, void *)) walk_metadata_union; break
        case METADATA_CUSTOM: f = (void (*)(void *, void *)) walk_metadata_custom;
        default: Debugger();
        }
        (*f)((void *)metadata, (void *) seen);
    }
} static void
instance_metadata(SXobject instance)
{
    SXclass_o cl = (SXclass_o)CLASSOF(instance);
    SXclass_o  sc;
    SXint offset = cl->allocz;
    SXint i;
    MetaDataPtr metadata;

for(i = 0; i < cl->vecSize; i++) {
        sc = cl->precedenceVector[i];
        metadata = sc->metadata;
        if (metadata != 0) {
            printf("sc = %s, md = %x\n",sc->name, metadata);
            memory_mutex = 0;
            walk_metadata(metadata, 0);
            memory_mutex = 1;
        }
        offset -= sc->myIVSize;
    }
} static
void scan_memory_segment_with_metadata(BPTR low, BPTR high, MetaData *md)
{
    scan_memory_segment(low,high);
}

/* Snapshot-at-gc-start write barrier.
   This is really just a specialized version of scan_memory_segment */
void * SXwrite_barrier(int * lhs_address, int rhs)
{
    if (memory_mutex == 1) {
        printf("HEY! write_barrier called from within GC!\n");
        Debugger();
        return((void *) (*lhs_address = rhs));
```

```
rtgc.c                                                                    Page 9
Wednesday, June  , 1994 4:47 PM }
    if (enable_write_barrier) {
        BPTR object;
        GCPTR gcptr;

if (ENABLE_VISUAL_MEMORY) START_CODE_TIMING;
        object = *((BPTR *) lhs_address);
        if (IN_HEAP(object)) {
            gcptr = interior_to_gcptr(object);  /* (GCPTR)(object - 8); */
            if WHITEP(gcptr) {
                SXmake_object_gray(gcptr, (BPTR) -1);
            }
        }
        if (ENABLE_VISUAL_MEMORY) END_CODE_TIMING(total_write_barrier_time_in_cycle);
    }
    return((void *) (*lhs_address = rhs));
} void * SXsafe_bash(int * lhs_address, int rhs)
{
    BPTR object;
    GCPTR gcptr;

if (CHECK_BASH) {
        object = *((BPTR *) lhs_address);
        if ((IN_HEAP(object))) {
            gcptr = interior_to_gcptr(object);
            if WHITEP(gcptr) {
                if (memory_mutex == 1) {
                    printf("HEY! write_barrier called from within GC!\n");
                    Debugger();
                    return((void *) (*lhs_address = rhs));
                }
                Debugger();
            }
        }
    }
    return(SXwrite_barrier(lhs_address,rhs));
} void * SXsafe_setfInit(int * lhs_address, int rhs)
{
    BPTR object;

if (CHECK_SETFINIT) {
        object = *((BPTR *) lhs_address);
        if (object != NULL) {
            /* if ((int) object != rhs) */
            Debugger();
        }
    }
    return((void *) (*lhs_address = rhs));
```

- 36 -

```
rtgc.c                                                                  Page 10
Wednesday, June 1, 1994  4:47 PM

} void *ptrcpy(void *p1, void *p2, int num_bytes)
{
    if (enable_write_barrier) {
        if (ENABLE_GC_TIMING) START_CODE_TIMING;
        pause_ok_flag = 0;
        scan_memory_segment(p1, (BPTR)p1+num_bytes);
        pause_ok_flag = 1;
        if (ENABLE_GC_TIMING) END_CODE_TIMING(total_write_barrier_time_in_cycle);
    }
    memcpy(p1,p2,num_bytes);
    return(p1);
} void *ptrset(void *p1, int data, int num_bytes)
{
    if (enable_write_barrier) {
        pause_ok_flag = 0;
        scan_memory_segment(p1, (BPTR)p1+num_bytes);
        pause_ok_flag = 1;
    }
    memset(p1,data,num_bytes);
    return(p1);
} static
void copyThreadInfo(SXobject thread)
{
    if (next_thread < THREAD_LIMIT) {
        threads[next_thread].thread = thread;
        setNeedSniff(thread);
        next_thread = next_thread + 1;
    } else {
        /* HEY! Should alloc a bigger buffer */
        printf("Too many Threads!\n");
        exit(1);
    }
} static
void save_thread_state()
{
    next_thread = 0;
    SXforEach(SXallThreads, (SXfunction) copyThreadInfo, NULL);
} void SXscan_thread(SXobject thread)
{
    BPTR bottom = SXgetStackBase (thread);
    /* Only scan threads with a real stack and skip the gc thread! */
    if ((bottom != 0) && (thread != gc_thread)) {
```

- 37 -

```
            int num_registers;
            BPTR top = SXgetStackTop (thread);
            BPTR ptr_aligned_top = (BPTR) ((int) top & -(GC_POINTER_ALIGNMENT - 1));
            BPTR regptr = SXthread_registers(thread, &num_registers);

/* Scan thread state atomically!!! */
            pause_ok_flag = 0;
            /* HEY! reg ptrs are aligned on 4 byte boudaries... */
            scan_memory_segment(regptr, regptr + (num_registers * 4));
            scan_memory_segment(ptr_aligned_top, bottom);
            pause_ok_flag = 1;
        }
        clearGCSniff(thread);
} static
void scan_threads()
{
    while (next_thread > 0) {
        next_thread = next_thread - 1;
        SXscan_thread(threads[next_thread].thread);
        MAYBE_PAUSE_GC;
    }
} static
void scan_globals()
{
#if   ENABLE_EXPLICIT_GLOBAL_ROOTS
        scan_explicit_global_roots();
#else
        scan_memory_segment(first_globals_ptr,last_globals_ptr);
        if (first_globals_ptr2)
            scan_memory_segment(first_globals_ptr2,last_globals_ptr2);
#endif
} static
void scan_static_space()
{
    BPTR next, low, end;
    GCPTR gcptr;
    int size;

next = first_static_ptr;
    end = last_static_ptr;
    while (next < end) {
        size = *((int *) next);
        size = size >> LINK_INFO_BITS;
        low = next + sizeof(GCPTR);
        next = low + size;
        gcptr = (GCPTR) (low - sizeof(GC_HEADER));
        scan_object(gcptr, size + sizeof(GC_HEADER));
```

```
        /* Delete me! HEY! Convert to common scanner with scan_object
        if (GET_STORAGE_CLASS(gcptr) != SC_NOPOINTERS) {
            scan_memory_segment(low,next);
        } */
    }
} static
void scan_root_set()
{
    last_gc_state = "Scan Threads";
    UPDATE_VISUAL_STATE();
    scan_threads();
    last_gc_state = "Scan Globals";
    UPDATE_VISUAL_STATE();
    scan_globals();
    last_gc_state = "Scan Statics";
    UPDATE_VISUAL_STATE();
    scan_static_space();
} void scan_object(GCPTR ptr, int total_size)
{
    BPTR bptr, low, high;

bptr = (BPTR) ptr;
    low = bptr + sizeof(GC_HEADER);
    high = bptr + total_size;
    switch (GET_STORAGE_CLASS(ptr)) {
    case SC_NOPOINTERS: break;
    case SC_POINTERS:
        scan_memory_segment(low, high);
        break;
    case SC_METADATA:
        scan_memory_segment_with_metadata(low,high,0);
        break;
    case SC_INSTANCE:
        /* instance_metadata((SXobject) low); */
        scan_memory_segment_with_metadata(low,high,0);
        break;
    default: Debugger();
    }
} static
void scan_object_with_group(GCPTR ptr, GPTR group)
{
    scan_object(ptr, group->size);
    SET_COLOR(ptr,marked_color);
    group->black = ptr;
    group->black_count = group->black_count + 1;
}
```

```
/* HEY! Fix this up now that it's not continuation based... */
static
void scan_gray_set()
{
    int i, scan_count, rescan_all_groups;

last_gc_state = "Scan Gray Set";
    UPDATE_VISUAL_STATE();
    i = MIN_GROUP_INDEX;
    scan_count = 0;
    do {
        while (i <= MAX_GROUP_INDEX) {
            GPTR group = &groups[i];
            GCPTR current = group->black;
            /* current could be gray, black, or green */
            if ((current != NULL) && (!(GRAYP(current)))) {
                current = GET_LINK_POINTER(current->prev);
            }
            while (current != NULL) {
                MAYBE_PAUSE_GC;
                scan_object_with_group(current,group);
                scan_count = scan_count + 1;
                current = GET_LINK_POINTER(current->prev);
            }
            i = i + 1;
        }
        if (scan_count > 0) {
            rescan_all_groups = 1;
            i = MIN_GROUP_INDEX;
            scan_count = 0;
        } else {
            rescan_all_groups = 0;
        }
    } while (rescan_all_groups == 1);
    MAYBE_PAUSE_GC;
} static
void flip()
{
    int i;
    GPTR group;
    GCPTR free, prev, free_last, black;
    double percent_used;

MAYBE_PAUSE_GC;
    last_gc_state = "Flip";
    for (i = MIN_GROUP_INDEX; i <= MAX_GROUP_INDEX; i++) {
        group = &groups[i];
        group->gray = NULL;
        free = group->free;
        if (free != NULL) {
```

```
rtgc.c                                                                                Page 14
Wednesday, June 1, 1994  4:47 PM prev = GET_LINK_POINTER(free->prev);
            if (prev != NULL) {
                SET_LINK_POINTER(prev->next,NULL); /* end black set */
            }
            SET_LINK_POINTER(free->prev,NULL);
        } else {
            free_last = group->free_last;
            if (free_last != NULL) {
                SET_LINK_POINTER(free_last->next,NULL); /* end black set */
            }
            group->free_last = NULL;
        } black = group->black;
        if (black == NULL) {
            printf("YOW!\n");
        }
        group->white = (GREENP(black) ? NULL : black);

group->black = group->free;
        group->white_count = group->black_count;
        group->black_count = 0;
    }
    SWAP(marked_color,unmarked_color);
    save_thread_state();
}

/* We need to change garbage color now so that conservative
   scanning doesn't start making free objects that look white turn gray! */
static
GCPTR recycle_group_garbage(GPTR group)
{
    GCPTR next;
    GCPTR last;
    int count = 0;

last = NULL;
    next = group->white;
    while (next != NULL) {
        int page_index = PTR_TO_PAGE_INDEX(next);
        PPTR page = &pages[page_index];
        int old_bytes_used = page->bytes_used;
        page->bytes_used = page->bytes_used - group->size;
        if (VISUAL_MEMORY_ON) {
            SXmaybe_update_visual_page(page_index,old_bytes_used,page->bytes_used);
        } if (GET_STORAGE_CLASS(next) == SC_INSTANCE) {
            SXobject obj = (SXobject) ((BPTR) next + 8);
            void (*finalize)(SXobject) = (*obj)->finalize;
            if (finalize != NULL) {
                /* printf("class = %s\n",(*(SXclass_o *) obj)->name); */
                /* UG! We're code that does SXgeneric dispatches, which may
```

- 41 -

```
                        in turn try to allocate storage. */
                    memory_mutex = 0;
                    if ((int) finalize != 1) {
                        finalize(obj);  /* Single-inheritance speed optimization */
                    } else {
                        SXfinalize(obj); /* Multiple-inheritance */
                    }
                    /* SXfinalize(obj); */
                    memory_mutex = 1;
            }
        }
        SET_COLOR(next,GREEN);
        if (DETECT_INVALID_REFS) memset((BPTR) next + 8, INVALID_ADDRESS, group->size
        last = next;
        next = GET_LINK_POINTER(next->next);
        count = count + 1;
        MAYBE_PAUSE_GC;
    }

/* HEY! could unlink free obj on pages whose count is 0. Then hook remaining
       frag free onto free list and coalesce 0 pages */
    if (count != group->white_count) {
        SXverify_all_groups();
        Debugger();
    }
    /* Append garbage to free list. Not great for a VM system, but it's easier */
    if (last != NULL) {
        SET_LINK_POINTER(last->next,NULL);

if (group->free == NULL) {
            group->free = group->white;
        }
        if (group->black == NULL) {
            group->black = group->white;
        } if (group->free_last != NULL) {
            SET_LINK_POINTER((group->free_last)->next,group->white);
        }
        SET_LINK_POINTER((group->white)->prev, group->free_last);
        group->free_last = last;
        group->green_count = group->green_count + count;
    }
    group->white = NULL;
    group->white_count = 0;
    return(last);
} static
void recycle_all_garbage()
{
    int i;
```

```
    last_gc_state = "Recycle Garbage";
    UPDATE_VISUAL_STATE();
    for (i = MIN_GROUP_INDEX; i <= MAX_GROUP_INDEX; i++) {
        recycle_group_garbage(&groups[i]);
    }
    coalesce_all_free_pages();
} void SXset_gc_pause_flag(void)
{
    pause_gc_flag = 1;
} void SXrestart_gc(void)
{
if (OS == MAC_OS)
    SXrelinquish (gc_thread_condition);
#endif
} static
void setGCIncrement(int n)
{
    SXlong time;
    time.hi = 0;
    time.lo = n;

SXsetTime (gc_callback, &time);
    gc_increment = n;
    if (n == 0) {
        SXsetiv(gc_thread_clock, rate, 0);
        SXsetiv(gc_clock, rate, 0);
        SXsetTime(gc_thread_callback, &time);
    } else {
        SXlong time;
        time.hi = 0;
        time.lo = 50;
        SXsetiv(gc_thread_clock, rate, kFix1);
        SXsetiv(gc_clock, rate, kFix1);
        SXsetTime(gc_thread_callback, &time);
    }
    UPDATE_VISUAL_STATE();
}

SXobject SXsetGcIncrement(SXobject n)
{

/* This function is a nop for Windows */
#if (OS == MAC_OS)
    setGCIncrement(SXintFrom(n));
    return(n);
#elif (OS == WINDOWS_OS)
    return SXundefined;
```

```
rtgc.c                                                                                    Page 17
Wednesday, June 1, 1994  4:47 PM endif
} static
void init_gc_pause_callback()
{ if (OS == MAC_OS)
    int ticks_per_second;
    SXobject callback;
    SXlong time;
    time.hi = 0;
    time.lo = 50;   /* 50 means 1000/50 = 20 times per second */ ticks_per_second = 1000;
    gc_thread_condition = SXmakeCondition (SXundefined);

gc_clock = SXmakeClock(SXundefined, immed(ticks_per_second), SXundefined);

#ifdef THREAD_CALLBACK
    gc_thread_clock = SXmakeClock(SXundefined, immed(ticks_per_second), SXundefined);
    #endif gc_callback =  SXmakeTimeCallBack (gc_clock, falseObject, (SXfunction) SXset_gc_pa
                                   NULL, SXiforward, SXiinterrupt,
                                   SXstrToObj ("GCpauseCB"));

#ifdef THREAD_CALLBACK
    gc_thread_callback = SXmakeTimeCallBack (gc_thread_clock, falseObject,
                                   (SXfunction) SXrestart_gc,
                                   NULL, SXiforward, SXisystem,
                                   SXstrToObj ("GCrestartCB"));
    #endif setGCIncrement(DEFAULT_GC_INCREMENT);
    SXsetiv(gc_clock, rate, kFix1);

#ifdef THREAD_CALLBACK
    SXsetiv(gc_thread_clock, rate, kFix1);
    SXsetTime(gc_thread_callback, &time);
    #endif elif (OS == WINDOWS_OS)
    tgtTime = SXgetMDClockCounter () + SXgcTicks;
#endif
} static
void reset_gc_pause_callback()
{
if (OS == MAC_OS)
    SXlong zero;
```

```
    zero.hi = 0;
    zero.lo = 0;
    pause_gc_flag = 0;
    SXsetTime(gc_clock,&zero);
#elif (OS == WINDOWS_OS)
    tgtTime = SXgetMDClockCounter () + SXgcTicks;
#endif
} static
void start_gc_increment()
{
    total_viz_mem_time_in_increment = 0.0;
    if (VISUAL_MEMORY_ON) SXvisual_runbar_on();
    if (memory_mutex == 1) {
        printf("Error - GC within GC!\n"); Debugger();
    }
    if (ENABLE_GC_TIMING) CPU_TOCKS(start_gc_increment_tocks);
    if (run_to_completion_without_pausing == 0) {
        reset_gc_pause_callback();
    }
    memory_mutex = 1;
    pause_ok_flag = 1;

} static
void end_gc_increment()
{
    memory_mutex = 0;
    pause_gc_flag = 0;
    if (VISUAL_MEMORY_ON) SXvisual_runbar_off();
    if (ENABLE_GC_TIMING) {
        double increment_time;
        ELAPSED_MILLISECONDS(start_gc_increment_tocks,increment_time);
        increment_time = increment_time - total_viz_mem_time_in_increment;
        total_gc_time_in_cycle = total_gc_time_in_cycle + increment_time;
        increment_count = increment_count + 1;
        max_increment_in_cycle = MAX(max_increment_in_cycle,increment_time);
    }
    if (thread_awaiting_complete_gc == 0) {
#if (OS == MAC_OS)
        #ifdef THREAD_CALLBACK
        SXlong zero;
        zero.hi = 0;
        zero.lo = 0;
        SXsetTime(gc_thread_clock,&zero);
        #endif SXgateWait (gc_thread_condition);
elif (OS == WINDOWS_OS)
        SXthreadYield();
#endif
```

```
    } else {
        SXobject thread = thread_awaiting_complete_gc;
        thread_awaiting_complete_gc = 0;
        SXthreadYieldTo(thread);
    }
} void SXpause_gc()
{
    if (run_to_completion_without_pausing == 0) {
        end_gc_increment();
        /* At this point we are resuming from a thread yield */
        start_gc_increment();
    }
}

/* HEY! sleep and awaken should stop the pause and wakeup clocks from
   even going off! */
void SXsleep_gc()
{
    gc_sleeping = 1;
    memory_mutex = 0;
    pause_ok_flag = 0;
    if (VISUAL_MEMORY_ON) SXvisual_runbar_off();
    SXthreadDeactivate(gc_thread);
    start_gc_increment();
} void SXawaken_gc()
{
    if (enable_gc && (gc_thread != 0)) {
        gc_sleeping = 0;
        SXthreadActivate(gc_thread);
    }
} static
void reset_gc_cycle_stats()
{
    total_allocation_this_cycle = 0;
    total_gc_time_in_cycle = 0.0;
    total_write_barrier_time_in_cycle = 0.0;
    max_increment_in_cycle = 0.0;
    increment_count = 0;
    if (ENABLE_GC_TIMING) CPU_TOCKS(start_gc_cycle_tocks);
} static
void summarize_gc_cycle_stats()
{
    double total_cycle_time;
```

```
rtgc.c                                                                    Page 20
Wednesday, June 1, 1994  4:47 PM if (ENABLE_GC_TIMING) {
            ELAPSED_MILLISECONDS(start_gc_cycle_tocks,total_cycle_time);
            last_cycle_ms = total_cycle_time;
            last_gc_ms = total_gc_time_in_cycle;
            last_increments = increment_count;
            last_max_increment_ms = max_increment_in_cycle;
            last_write_barrier_ms = total_write_barrier_time_in_cycle;
        }
        if (VISUAL_MEMORY_ON) SXdraw_visual_gc_stats();
} static
void full_gc()
{
    reset_gc_cycle_stats();
    gc_done = 0;
    flip();
    scan_root_set();
    scan_gray_set();

enable_write_barrier = 0;
    recycle_all_garbage();
    enable_write_barrier = 1;

gc_count = gc_count + 1;
    gc_done = 1;
    summarize_gc_cycle_stats();
    last_gc_state = "Cycle Complete";
    UPDATE_VISUAL_STATE();
    if (run_to_completion_without_pausing == 1) {
        run_to_completion_without_pausing = 0;
        SXpause_gc();
    }
    MAYBE_SLEEP_GC;
} static
void gc_loop(SXobject bogus_arg)
{
    start_gc_increment();
    while(1) {
        full_gc();
    }
}

/* Run the current gc cycle to completion without pausing. */
static
void run_gc_to_completion(void)
{
  run_to_completion_without_pausing = 1;
  thread_awaiting_complete_gc = SXrunningThread;
  SXthreadCriticalUp();
  SXrestart_gc();    /* ensure that GC thread is not waiting on a condition */
```

```
rtgc.c                                                                                    Page 21
Wednesday, June  , 1994  4:47 PM SXthreadYieldTo(gc_thread);
    SXthreadCriticalDown();
}

SXobject SXgc(void)
{
    if (gc_thread != 0) {
        run_gc_to_completion();
        run_gc_to_completion();
        return(immed(gc_count));
    }
} void SXinit_realtime_gc()
{
    int thread_bytes;

gc_thread = 0;
    gc_count = 0;
    gc_sleeping = 0;
    enable_gc = 0;
    run_to_completion_without_pausing = 0;
    thread_awaiting_complete_gc = 0;
    visual_memory_on = 0;
    last_gc_state = "<initial state>";

thread_bytes = sizeof(THREAD_INFO) * THREAD_LIMIT;
    threads = malloc(thread_bytes);

if (threads == 0) {
        out_of_memory("ScriptX",thread_bytes / 1024);
    }
    ok_to_gc_in_growzone = 1;
} endif /* Conditional inclusion of file */

/* Use #elseif and avoid internal #if stuff */ void SXstart_gc()
{
#if ENABLE_REALTIME_GC
    enable_gc = 1;
    init_gc_pause_callback();
    /* Be sure to start the gc deactivated since it uses the value of gc_thread */
    gc_thread = SXmakeRegularThread (SXstrToObj ("Garbage Collector"),
                SXfnToObject (gc_loop, 1), SXundefined, SX_PRIORITY_GC,
                SXiNonPreemptible, trueObject, SXundefined);
    SXawaken_gc();
#endif
} void SXcancel_gc_pause_callback()
```

- 48 - rtgc.c　　　　　　　　　　　　　　　　　　　　　　　　　　　　　　　　　　　　　　　　　　　　　Page 22
Wednesday, June 1, 1994  4:47 PM

```
{
#if ENABLE_REALTIME_GC
    gc_sleeping = 0;                    /* Don't let allocation reactivate the GC! */
    if (gc_thread != 0) {
        SXthreadKill(gc_thread);
#if (OS == MAC_OS)
        SXcancel(gc_callback);
#endif
    }
endif
}
``` rtalloc.c  
Wednesday, May ~~, 1994  3:02 PM  Page 1

```c
/* Real time Storage allocater

* History (Most recent first):    $Log: rtalloc.c,v $
 * Revision 1.2  1994/05/19  01:26:42  wade
 * Montery fixes
 *
 * Revision 1.1  1994/05/05  02:57:41  wade
 * memory reorg + misc fixes
 *
 * Revision 1.114  1994/04/28  18:09:08  clayton
 * Beta changes made in main branch (nop setgcincrement() for Windows)
 *
 * $End_of_Log$
 *
 */ include "gdefs.h"
include "oic.h"
#include <assert.h>
include _f_mem_internals_h_
#include _f_KFixedMath_h_
#include "priority.h"
#include "metadata.h"

#pragma ignoreroot groups pages
GROUP_INFO *groups;
PAGE_INFO *pages;
HOLE_PTR empty_pages;

/* HEY! Only 1 static segment while these are global! */
BPTR first_static_ptr;
BPTR last_static_ptr;

BPTR first_partition_ptr;
BPTR last_partition_ptr;

BPTR first_globals_ptr;
BPTR last_globals_ptr;
BPTR first_globals_ptr2;
BPTR last_globals_ptr2;

SEGMENT *segments;
int total_segments;

int total_partition_pages;
int memory_mutex;
int ok_to_gc_in_growzone; /* Only used by the mac */ int unmarked_color;
int marked_color;
int enable_gc;
int enable_write_barrier;
```

− 50 − rtalloc.c  
Wednesday, May 25, 1994  3:02 PM                                                                         Page 2

```c
int tracing_mem_usage;

int total_allocation;
int total_requested_allocation;
int total_requested_objects;
int total_allocation_this_cycle;

SXbool  SXgPrintAllocationSwitch = SXfalse;

static
int size_to_group_index(int size)
{
    int s = size;
    int index = 0;

s = s - 1;
    while (s != 0) {
        s = s / 2;
        index = index + 1;
    }
    return(MAX(MIN_GROUP_INDEX, index));
} static
void init_group_info()
{
    int size, index;

for (index = MIN_GROUP_INDEX; index <= MAX_GROUP_INDEX; index = index + 1) {
        size = 1 << index;
        groups[index].size = size;
        groups[index].index = index;
        groups[index].free = NULL;
        groups[index].free_last = NULL;
        groups[index].white = NULL;
        groups[index].black = NULL;
        groups[index].gray = NULL;
        groups[index].gray = NULL;
        groups[index].total_object_count = 0;
        groups[index].white_count  = 0;
        groups[index].black_count  = 0;
        groups[index].green_count  = 0;
    }
} static
void init_page_info()
{
    int i;

for (i = 0; i < total_partition_pages; i++) {
        /* Could put the next two in a per segment table to save memory */
        pages[i].base = NULL;
```

- 51 - rtalloc.c                                                                                          Page 3
Wednesday, May 25, 1994 3:02 PM

```
            pages[i].bytes_used = 0;
            pages[i].group = SYSTEM_PAGE;
        }
    } void SXinit_empty_pages(int first_page, int page_count, int type)
    {
        int last_page = first_page + page_count;
        int i;
        HOLE_PTR new_hole;

for (i = first_page; i < last_page; i++) {
            /* Could put the next two in a per segment table to save memory */
            pages[i].base = NULL;
            pages[i].bytes_used = 0;
            pages[i].group = EMPTY_PAGE;
            if (VISUAL_MEMORY_ON) SXupdate_visual_page(i);
        } if (type == HEAP_SEGMENT) {
            /* Add the pages to the front of the empty page list */
            new_hole = (HOLE_PTR) PAGE_INDEX_TO_PTR(first_page);
            new_hole->page_count = page_count;
            new_hole->next = empty_pages;
            empty_pages = new_hole;
        } else {
            /* HEY! fix this to allow more than 1 static segment */
            last_static_ptr = segments[0].last_segment_ptr;
            first_static_ptr = last_static_ptr;
        }
    }

/* HEY! This belongs in oicAccessors.h. What does the wierd unimmed stuff in there do
    #define unimmed(x)   (((int) (x) - 1) >> 2)

static
    int allocate_segment(int desired_bytes, int type)
    {
        int actual_bytes;
        BPTR first_segment_ptr;
        int sysfree;

if (total_segments < MAX_SEGMENTS) {
            sysfree = unimmed(SXlargestFreeSystemBlock());
            desired_bytes = ((desired_bytes / BYTES_PER_PAGE) + 2) * BYTES_PER_PAGE;
            /* HEY! maybe take less. At least make the cushion a mem-config param */
            if (sysfree < (desired_bytes + 10000)) {
                actual_bytes = 0;
            } else {
                int old_flag;
                int segment_page_count, first_segment_page;
                int segment = total_segments;
                actual_bytes = desired_bytes - BYTES_PER_PAGE;
```

- 52 -

```
rtalloc.c                                                               Page 4
Wednesday, May 25, 1994  3:02 PM old_flag = ok_to_gc_in_growzone;
            ok_to_gc_in_growzone = 0;
            first_segment_ptr = SXbig_malloc(desired_bytes);
            ok_to_gc_in_growzone = old_flag;

if (first_segment_ptr)
            {
            total_segments = total_segments + 1;
                segment_page_count = actual_bytes / BYTES_PER_PAGE;
                first_segment_ptr = ROUND_UP_TO_PAGE(first_segment_ptr);

segments[segment].first_segment_ptr = first_segment_ptr;
                segments[segment].last_segment_ptr = first_segment_ptr +
                                                (segment_page_count * BYTES_PER_PAGE)
                segments[segment].segment_page_count = segment_page_count;
                segments[segment].type = type;

first_segment_page = PTR_TO_PAGE_INDEX(first_segment_ptr);
                SXinit_empty_pages(first_segment_page, segment_page_count, type);
            }
            else
                actual_bytes = 0;
        }
    } else {
        actual_bytes = 0;
    }
    return(actual_bytes);
} static
GCPTR allocate_empty_pages(int required_page_count, int min_page_count, GPTR group)
{
    HOLE_PTR next, prev, rest, best, best_prev;
    GCPTR base;
    int remaining_page_count, best_remaining_page_count, next_page_index;

next = empty_pages;
    base = NULL;
    prev = NULL;
    best = NULL;
    best_prev = NULL;

/* Search for a best fit hole */
    best_remaining_page_count = total_partition_pages + 1;
    while ((best_remaining_page_count > 0) && (next != NULL)) {
        if (next->page_count >= required_page_count) {
            remaining_page_count = next->page_count - required_page_count;
            if (remaining_page_count < best_remaining_page_count) {
                best_remaining_page_count = remaining_page_count;
                best = next;
                best_prev = prev;
            }
```

```
rtalloc.c                                                                Page 5
Wednesday, May __, 1994  3:02 PM }
        prev = next;
        next = next->next;
    } if (best != NULL) {
        if (best_remaining_page_count == 0) {
            rest = best->next;
        } else {
            rest = (HOLE_PTR) ((BPTR) best + (required_page_count * BYTES_PER_PAGE));
            rest->page_count = best_remaining_page_count;
            rest->next = best->next;
        }
        if (best_prev == NULL) {
            empty_pages = rest;
        } else {
            best_prev->next = rest;
        }
        base = (GCPTR) best;
    }

/* Initialize page table entries */
    if (base != NULL) {
        int i;
        next_page_index = PTR_TO_PAGE_INDEX(((BPTR) base));
        for (i = 1; i <= required_page_count; i++) {
            pages[next_page_index].base = base;
            pages[next_page_index].group = group;
            pages[next_page_index].bytes_used = 0;
            next_page_index = next_page_index + 1;
        /* if ((i % min_page_count) == 0) {
                if (VISUAL_MEMORY_ON) SXupdate_visual_page(next_page_index - min_page_
            } */
        }
    }
    return(base);
} static
void init_pages_for_group(GPTR group, int min_pages)
{
    int i, num_objects, page_count, pages_per_object, byte_count;
    int min_page_count;
    GCPTR base;
    GCPTR prev;
    GCPTR current;
    GCPTR next;

pages_per_object = group->size / BYTES_PER_PAGE;
    byte_count = MAX(pages_per_object,min_pages) * BYTES_PER_PAGE;
    num_objects = byte_count >> group->index;
    page_count = (num_objects * group->size) / BYTES_PER_PAGE;
    min_page_count = MAX(1,pages_per_object);
```

- 54 - rtalloc.c                                                                    Page 6
Wednesday, May _5, 1994 3:02 PM

```c
        base = allocate_empty_pages(page_count, min_page_count, group);

/* HEY! do this somewhere else? */
        if (base == NULL) {
            int actual_bytes = allocate_segment(MAX(DEFAULT_HEAP_SEGMENT_SIZE,
                                           page_count * BYTES_PER_PAGE),
                                           HEAP_SEGMENT);
            if (actual_bytes < byte_count) {
                memory_mutex = 0; /* allow SXgc() to thread switch */
                SXgc();
                memory_mutex = 1;
            }
            base = allocate_empty_pages(page_count, min_page_count, group);
        } if (base != NULL) {
            next = base;
            if (group->free == NULL) {
                group->free = next;
            }
            current = group->free_last;
            if (current == NULL) {      /* No gray, black, or green objects? */
                group->black = next;
            } else {
                SET_LINK_POINTER(current->next,next);
            }
            for (i = 0; i < num_objects; i++) {
                prev = current;
                current = next;
                next = (GCPTR) ((BPTR) current + group->size);
                current->prev = prev;
                current->next = next;
                SET_COLOR(current,GREEN);
            }
            SET_LINK_POINTER(current->next,NULL);
            group->free_last = current;
            group->green_count = group->green_count + num_objects;
            group->total_object_count = group->total_object_count + num_objects;
        }
    }
} static GPTR allocationGroup(void * metadata, SXint size,
                        int *return_data_size, int *return_real_size, void *return
{
    int data_size, real_size;
    int group_index;
    GPTR group;

if (size >= 0) {
        switch ((int) metadata) {
        case (int) SXnopointers:
        case (int) SXpointers:
```

- 55 -

```
rtalloc.c                                                                    Page 7
Wednesday, May  3, 1994  3:02 PM data_size = size;
                real_size = size + sizeof(GC_HEADER); break;
            default:
                if (METADATAP(metadata)) {
                    /* We count the metadata ptr in data_size for compatability with insta
                    data_size = (size * (((MetaData *) metadata)->nBytes)) + sizeof(void *
                    real_size =  data_size + sizeof(GC_HEADER);
                } else {
                    if (size != 1) {
                        printf("Error, you may not allocate %d instances\n", size);
                    }
                    if (PROXYP (metadata))
                    {
                        SXredirect ((SXobject) metadata, NULL, (SXobject *) &metadata);
                    }
                    data_size = ((SXclass_o) metadata)->allocz;
                    real_size = data_size + sizeof(GC_HEADER);
                }
                break;
            }
            group_index = size_to_group_index(real_size);
            if (group_index > MAX_GROUP_INDEX) {
                SXreport (generalError, SXstrToObj ("Maximum object size exceeded"));
            } else {
                group = &(groups[group_index]);
            }
            *return_data_size = data_size;
            *return_real_size = real_size;
            *((SXobject *) return_metadata) = (SXobject) metadata;
            return(group);
        } else {
            SXreport (generalError, SXstrToObj ("Negative object size"));
        }
    }

SXint SXstackAllocationSize(void * metadata, SXint size)
    {
        int data_size, real_size;
        GPTR group = allocationGroup(metadata,size, &data_size, &real_size, &metadata);
        return(real_size);
    }

SXobject SXtotalFreeHeapSpace()
    {
        int free = 0;
        int index;
        HOLE_PTR next;

next = empty_pages;
        while (next != NULL) {
            free = free + (next->page_count * BYTES_PER_PAGE);
            next = next->next;
        }
```

```
rtalloc.c                                                                     Page 8
Wednesday, May 25, 1994  3:02 PM for (index = MIN_GROUP_INDEX; index <= MAX_GROUP_INDEX; index = index + 1) {
        int group_free = groups[index].green_count * groups[index].size;
        free = free + group_free;
    } return(immed(free));
}

SXobject SXlargestFreeHeapBlock()
{
    int largest = 0;
    int index;
    HOLE_PTR next;

next = empty_pages;
    while (next != NULL) {
        largest = MAX(largest, next->page_count * BYTES_PER_PAGE);
        next = next->next;
    } index = MAX_GROUP_INDEX;
    while (index >= MIN_GROUP_INDEX) {
        if (groups[index].free != NULL) {
            largest = MAX(largest,groups[index].size);
            index = 0;
        } else {
            index = index - 1;
        }
    } return(immed(largest));
}

/* HEY! fix this or delete it */
SXobject SXmemHighTide()
{
    int bytes = 0;
    return(immed(bytes / 1024));
}

SXint SXallocationTrueSize(void * metadata, SXint size)
{
    int data_size, real_size;

GPTR group = allocationGroup(metadata,size, &data_size, &real_size, &metadata);
    int md_size = ((metadata > SXpointers) ? 4 : 0);
    return(group->size - sizeof(GC_HEADER) - md_size);

}

SXint SXtrueSize(void *ptr)
{
```

- 57 -

```
rtalloc.c                                                                                    Page 9
Wednesday, May __, 1994  3:02 PM GPTR group = PTR_TO_GROUP(ptr);
    GCPTR gcptr = interior_to_gcptr(ptr);
    int md_size = ((GET_STORAGE_CLASS(gcptr) > SC_POINTERS) ? 4 : 0);
    return(group->size - sizeof(GC_HEADER) - md_size);
} void * SXinitializeObject(void * metadata, void * void_base, int total_size, int real_
{
    LPTR base = void_base;
    int limit, i;
    GCPTR gcptr = (GCPTR) base;

limit = ((DETECT_INVALID_REFS) ?
             ((real_size >> 2) + ((real_size % sizeof(LPTR)) != 0)):
             (total_size >> 2));
    for (i = 2; i < limit; i++) {
        *(base + i) = 0;         /* Clear old pointers! Memset as fast? */
    } switch ((int) metadata) {
    case (int) SXnopointers:
        SET_STORAGE_CLASS(gcptr,SC_NOPOINTERS);
        base = base + 2;
        break;
    case (int) SXpointers:
        SET_STORAGE_CLASS(gcptr,SC_POINTERS);
        base = base + 2;
        break;
    default:
        if (METADATAP(metadata)) {
            LPTR last_ptr = base + (total_size / 4) - 1;
            SET_STORAGE_CLASS(gcptr,SC_METADATA);
            *last_ptr = (int) metadata;
            base = base + 2;
        } else {

/* optionally, print out the name of the class being allocated */
            if (SXgPrintAllocationSwitch) {
                memory_mutex = 0;
                SXprinln((SXobject)metadata, SXiNormal, debug);
                memory_mutex = 1;
            }

SET_STORAGE_CLASS(gcptr,SC_INSTANCE);
            ((GCMDPTR) gcptr)->metadata = metadata;
            base = base + 2;
        }
        break;
    }
    SET_PROXY_INFO(base, 0);     /* an object is not a proxy by default! */
    return(base);
}
```

```
rtalloc.c                                                                Page 10
Wednesday, May 25, 1994  3:02 PM void * SXallocate(void * metadata, SXint size)
{
    int i, data_size, real_size, limit;
    GCPTR new;
    LPTR base;
    GPTR group;

if (memory_mutex) {
        printf("ERROR! alloc within GC!\n"); Debugger();
    } group = allocationGroup(metadata, size, &data_size, &real_size, &metadata);

if (TRACE_MEM_USAGE && tracing_mem_usage) {
            SXtrace_allocate(metadata, data_size, group->size);
    } memory_mutex = 1;

if (group->free == NULL) {
        init_pages_for_group(group,1);
        if (group->free == NULL) {
                out_of_memory("Heap", group->size);
        }
    }
    new = group->free;

group->free = GET_LINK_POINTER(new->next);
    SET_COLOR(new,marked_color); /* Allocate black! */
    group->green_count = group->green_count - 1;
    group->black_count = group->black_count + 1;

{
        int page_index = PTR_TO_PAGE_INDEX(new);
        PPTR page = &pages[page_index];
        int old_bytes_used = page->bytes_used;
        page->bytes_used = page->bytes_used + group->size;
        if (VISUAL_MEMORY_ON) {
            SXmaybe_update_visual_page(page_index,old_bytes_used,page->bytes_used);
        }
    } base = SXinitializeObject(metadata, (LPTR) new, group->size, real_size);

/* optional stats */
    total_requested_allocation = total_requested_allocation + data_size;
    total_allocation = total_allocation + group->size;
    total_requested_objects = total_requested_objects + 1;
    total_allocation_this_cycle = total_allocation_this_cycle + group->size;

memory_mutex = 0;
    MAYBE_AWAKEN_GC;
``` rtalloc.c                                                                                      Page 11
Wednesday, May ~~, 1994  3:02 PM

```c
#if 0
    /* this would be a more complete way to printout what is being allocated,
     * but it doesn't work... get a bus error.
     */
    if (SXgPrintAllocationSwitch) {
        SXprint_object_info((GCPTR)base,0);
    }
endif return(base);
} void * SXstaticAllocate(void * metadata, SXint size)
{
    int real_size, data_size;
    LPTR base;
    GPTR group;
    BPTR new_static_ptr;

/* We don't care about the group, just the GCHDR compatible real_size */
    group = allocationGroup(metadata, size, &data_size, &real_size, &metadata);
    data_size = ROUND_UPTO_LONG_ALIGNMENT(data_size);
    real_size = ROUND_UPTO_LONG_ALIGNMENT(real_size);

/* Static object headers are only 1 word long instead of 2 */
    /* HEY! add 8 byte alignment??? */
    new_static_ptr = first_static_ptr - (real_size - sizeof(GCPTR));

if (new_static_ptr >= segments[0].first_segment_ptr) {
        int first_static_page_index = PTR_TO_PAGE_INDEX(new_static_ptr);
        int last_static_page_index = PTR_TO_PAGE_INDEX(first_static_ptr);
        int index;

for (index = first_static_page_index; index < last_static_page_index; index++)
            pages[index].group = STATIC_PAGE;
            if (VISUAL_MEMORY_ON) SXupdate_visual_page(index);
        }
        first_static_ptr = new_static_ptr;
    } else {
        if (SXstartingScriptX == SXfalse) {
            /* HEY! allow more then 1 static segment? For now
               just dynamically allocate after booting */
            return(SXallocate(metadata,size));
        } else {
            out_of_memory("Static Space", real_size);
        }
    }
    if (TRACE_MEM_USAGE && tracing_mem_usage) {
        SXtrace_staticAllocate(metadata, data_size, real_size - sizeof(GCPTR));
    } base = (LPTR) first_static_ptr;
```

- 60 - rtalloc.c                                                                Page 12
Wednesday, May 25, 1994 3:02 PM

```c
    *base = (data_size << LINK_INFO_BITS);
    base = (LPTR) (((BPTR) base) - sizeof(GCPTR)); /* make base GCHDR compatible */
    base = SXinitializeObject(metadata, base, real_size, real_size);
    return(base);
} static
void * copy_object(LPTR src, int storage_class, SXint current_size, SXint new_size, SX
{
    BPTR new; LPTR new_base; LPTR src_base; int i;
    int limit = current_size >> 2;

switch (storage_class) {
    case SC_POINTERS:
        new = SXallocate(SXpointers,new_size); break;
    case SC_NOPOINTERS:
        new = SXallocate(SXnopointers,new_size); break;
    case SC_METADATA:
        {
            /* HEY! this needs to be fixed to use current_size instead of group_size */
            LPTR last_ptr = src + (group_size / 4) - 1;
            void *md = (void*)*last_ptr;
            if (METADATAP(md)) {
                new = SXallocate(md,new_size);
                limit = limit - 1;
            } else {
                printf("metadata bashed!\n");
                Debugger();
            }
        }
        break;

case SC_INSTANCE:
        new = SXallocate(((GCMDPTR) src)->metadata,new_size);
        break;
    default: printf("Error! Uknown storage class in realloc\n");
    }
    new_base = (LPTR) HEAP_OBJECT_TO_GCPTR(new);

/* No need for write barrier calls since these are initializing writes */
    for (i = 2; i < limit; i++) {
        *(new_base + i) = *(src + i);
    }
    return(new);
} void * SXreallocate(void *ptr, SXint new_size)
{
    GCPTR current;
    GPTR group;
    int storage_class;
```

- 61 -

```
rtalloc.c                                                                    Page 13
Wednesday, May _3, 1994  3:02 PM if (GC_DEBUG_MSGS) { printf("R %d ",new_size); fflush(stdout); } if (IN_HEAP(ptr)) {
            current = HEAP_OBJECT_TO_GCPTR(ptr);
            storage_class = GET_STORAGE_CLASS(current);
            group = pages[PTR_TO_PAGE_INDEX(current)].group;

/* HEY! subtract only 8 if we don't have metadata */
            if (new_size <= (group->size - 12)) {
                /* HEY! If the object shrinks alot, we should copy to a
                    smaller group size. Then free the current object? Dangerous
                    if other pointers to it exist. Maybe just let the GC find it.

Also Clear unused bits so we don't retain garbage!!! */
                return(ptr);
            } else {
                return(copy_object((LPTR) current, storage_class, group->size, new_size, g
            }
        } else {
            if (IN_STATIC(ptr)) {
                LPTR base = ((LPTR) ptr) - 1;
                int current_size = (*base << LINK_INFO_BITS);
                current = (GCPTR) (base - 1);
                storage_class = GET_STORAGE_CLASS(current);
                if (storage_class == SC_METADATA) {
                    printf("Cannot realloc static objects with metadata yet!!!\n");
                    Debugger();
                }
                return(copy_object((LPTR) current, storage_class, current_size + sizeof(GC
            } else {
                SXreport (generalError, SXstrToObj ("Cannot reallocate"));
            }
        }
}

/* Move object to the free set */
void SXdeallocate(void * ptr)
{
    GPTR group;
    GCPTR current;
    GCPTR prev;
    GCPTR next;
    int color;

if (memory_mutex) {
        printf("ERROR! dealloc within GC!\n"); Debugger();
    }
    if (ENABLE_DEALLOCATION) {
        /* Write me! */
    }
}

/* HEY! make this a macro for speed eventually??? 
```

```
rtalloc.c                                                                    Page 14
Wednesday, May 25, 1994 3:02 PM At least pass in the group ptr! */
GCPTR interior_to_gcptr(BPTR ptr)
{
    PPTR page = &pages[PTR_TO_PAGE_INDEX(ptr)];
    GPTR group = page->group;
    GCPTR gcptr;

if (group > EXTERNAL_PAGE) {
        if (group->size >= BYTES_PER_PAGE) {
            gcptr = page->base;
        } else {
            /* This only works because first_partition_ptr is
               BYTES_PER_PAGE aligned */
            gcptr = (GCPTR) ((int) ptr & (-1 << group->index));
        }
    } else {
        printf("ERROR! Found IN_HEAP pointer with NULL group!\n");
    } return(gcptr);
} static
int call_if_instance_of(GCPTR ptr, SXobject class, void (* func)(SXobject))
{
    int count;

SXobject header = ((SXobject) ptr) + 2;

if ((GET_STORAGE_CLASS(ptr) == SC_INSTANCE) &&
        ((SXobject) *header != SXInvalidObject) &&
           !PROXYP(header) &&
        SXisAKindOf(header, class)) {
        (*func)(header);
        count = 1;
    } else {
        count = 0;
    }
    return(count);
}

SXint SXforEachInstance(SXobject class, void (* func)(SXobject))
{
    SXint total_count = 0;
    int data_size, real_size;
    GCPTR current;
    GCPTR next;
    GPTR group = allocationGroup(class, 1, &data_size, &real_size, &class);
    int index;

if (ENABLE_REALTIME_GC) SXthreadCriticalUp();
```

- 63 -

```
rtalloc.c                                                                                        Page 15
Wednesday, May 25, 1994  3:02 PM for (index = group->index; index <= MAX_GROUP_INDEX; index++) {
        group = &(groups[index]);

/* White objects */
        current = group->white;
        while (current != NULL) {
            total_count = total_count + call_if_instance_of(current, class, func);
            current = GET_LINK_POINTER(current->next);
        }

/* Gray objects + Black objects */
        current = group->gray;
        if (current == NULL) {
            current = group->black;
        }
        while ((current != NULL) && (current != group->free)) {
            total_count = total_count + call_if_instance_of(current, class, func);
            current = GET_LINK_POINTER(current->next);
        }

}
    if (ENABLE_REALTIME_GC) SXthreadCriticalDown();
    return(total_count);
} void SXinit_heap(int first_segment_bytes, int static_size, BPTR first_usable_ptr, BPTR
{
    enable_write_barrier = 0;
    ok_to_gc_in_growzone = 0;
    total_allocation = 0;
    total_requested_allocation = 0;
    total_requested_objects = 0;

first_partition_ptr = ROUND_DOWN_TO_PAGE(first_usable_ptr);
    last_partition_ptr = ROUND_UP_TO_PAGE(last_usable_ptr);
    total_partition_pages = ((last_partition_ptr - first_partition_ptr) / BYTES_PER_PA /* We malloc vectors here so that they are NOT part of the global
       data segment, and thus will not be scanned. We don't want
       the GC looking at itself! */
    groups = malloc(sizeof(GROUP_INFO) * (MAX_GROUP_INDEX + 1));
    pages  = malloc(sizeof(PAGE_INFO) * total_partition_pages);
    segments = malloc(sizeof(SEGMENT) * MAX_SEGMENTS);
    if ((pages == 0) || (groups == 0) || (segments == 0)) {
        out_of_memory("ScriptX",first_segment_bytes/1024);
    } init_page_info();
    empty_pages = NULL;
    total_segments = 0;

if (allocate_segment(static_size, STATIC_SEGMENT) == 0) {
        out_of_memory("ScriptX",static_size/1024);
``` rtalloc.c
Wednesday, May 25, 1994  3:02 PM

Page 16

```
    }
    last_static_ptr = segments[0].last_segment_ptr;
    first_static_ptr = last_static_ptr;

if (allocate_segment(first_segment_bytes, HEAP_SEGMENT) == 0) {
        out_of_memory("ScriptX",first_segment_bytes/1024);
    } marked_color = GENERATION0;
    unmarked_color = GENERATION1;
    init_group_info();
    first_globals_ptr2 = 0;
    last_globals_ptr2 = 0;
    SXinit_global_bounds();
    if (ENABLE_REALTIME_GC) SXinit_realtime_gc();
}
```

Performance Analysis

The maximum GC duration is determined by the single longest step in the collection process. Step 62 (flip) is atomic but is of extremely short, constant duration. Essentially only two segments of the present collection method are both atomic and of variable duration: making the list of all live threads (step 66), and processing the live portion of a thread's state (step 68, with respect to a given thread). Thus, the worst case GC duration for the present method is proportional to the maximum number of live threads, and to the maximum thread state size allowed by the system in use.

Recall that the present garbage collector only restricts mutator execution at the beginning of each GC cycle until that mutator's corresponding thread state has been processed. Except for this part of the algorithm, the frequency of the GC increments is completely controllable by the mutator threads or scheduler 28 which decides when it is best for the collector to run. Hence, the worst case for GC frequency is again proportional to the number of live threads.

In practice, it has been found empirically that for typical, state-of-the-art multimedia systems, the maximum number of live threads and the maximum thread state size lead to worst-case bounds on GC frequency and duration that are acceptably within the requirements of typical multimedia application programs. Thus, the present invention has been found to solve a pressing problem in that, to the best of the author's knowledge, has not been satisfactorily addressed by any prior art systems in the field of garbage collection.

Another significant advantage of the present invention is its suitability for implementation on stock hardware. In other words, each of processors 26a–n may be a standard computer CPU (such as one in the Motorola® 68000 series, a SPARC® CPU, or Power PC®), or a virtual software processor running on standard hardware; special purpose hardware is not required. Those of skill in the art may of course recognize various opportunities to increase performance further through the use of some special purpose hardware. Such enhancement, while by no means necessary, remains squarely within the scope of the present invention.

It will be understood and appreciated by those of skill in the art that numerous variations on the preferred embodiments described herein are possible, while remaining within the spirit and scope of the present invention. The invention is limited only by the following claims.

I claim:

1. A method for performing real-time computer garbage collection, for use with a plurality of data objects and with one or more mutator programs, each one of said mutators having a corresponding thread and each one of said mutator threads having a corresponding thread state separate from said plurality of data objects, said method comprising the following steps:

commencing a new garbage collection cycle;

temporarily restricting execution of said mutators while processing the corresponding thread state for each one of said mutators;

permitting each one of said mutators to resume unrestricted execution, as soon as said mutator's own corresponding thread state has been processed;

completing the garbage collection cycle by identifying each one of said objects that is currently accessible to at least one of said mutators.

2. The method of claim 1, wherein said step of commencing a garbage collection cycle further includes the step of flipping one or more of said objects, from a first label representative of accessible status to a second label representative of undetermined status.

3. The method of claim 1, wherein said step of commencing a garbage collection cycle further includes the step of saving a list of said mutator threads.

4. The method of claim 1, wherein said step of temporarily restricting the execution of said mutators includes a first step of restricting said mutators from creating any new data objects, and a second step of temporarily suspending execution of said mutators.

5. The method of claim 1, wherein said step of completing the garbage collection cycle further includes the step of tracing one or more pointers stored in each of said mutator thread states.

6. The method of claim 1, wherein said step of completing the garbage collection cycle further includes the step of tracing one or more pointers stored in said objects, for each one of said objects that is in turn pointed to by at least one pointer stored in at least one of said mutator thread states.

7. The method of claim 1, wherein said step of completing the garbage collection cycle is performed without copying any object in said plurality of data objects.

8. The method of claim 1, wherein said step of completing the garbage collection cycle further includes the step of executing said mutators subject to a write barrier which is invoked when said mutators modify pointers within said plurality of data objects but not when said mutators modify pointers within said thread states.

9. An apparatus for performing real-time computer garbage collection, for use with a plurality of data objects and with one or more mutator programs, each one of said mutators having a corresponding thread and each one of said mutator threads having a corresponding thread state separate from said plurality of data objects, said apparatus comprising:

a garbage collector for processing the corresponding thread states of said mutators at the beginning of a garbage collection cycle, and for identifying each one of said data objects that is accessible to at least one of said mutators during said cycle;

one or more processors for executing said garbage collector and said mutators; and scheduling means coupled to said processors for scheduling execution of said garbage collector and said mutators on said processors, said scheduling means being operative to temporarily restrict execution of said mutators while the corresponding thread state is being processed for each one of said mutators, and to permit each one of said mutators to resume unrestricted execution as soon as said mutator's own corresponding thread state has been processed.

10. The apparatus of claim 9, wherein said garbage collector further includes means for flipping said one or more objects from a first label representative of accessible status to a second label representative of undetermined status.

11. The apparatus of claim 9, wherein said garbage collector further includes means for saving a list of said mutator threads.

12. The apparatus of claim 9, wherein said garbage collector includes means for tracing one or more pointers stored in each of said mutator thread states.

13. The apparatus of claim 9, wherein said garbage collector includes means for tracing one or more pointers stored in said data objects, for each one of said objects that is in turn pointed to by at least one pointer stored in at least one of said mutator thread states.

14. The apparatus of claim 9, wherein said garbage collector does not copy said data objects.

15. The apparatus of claim 9, wherein said one or more processors are implemented with stock hardware.

16. The apparatus of claim 9, wherein said scheduling means is operative to temporarily restrict said mutators from creating any new data objects, and is further operative to suspend execution of said mutators.

17. The apparatus of claim 9, further including means for executing said mutators subject to a write barrier which is invoked when said mutators modify pointers within said plurality of data objects but not when said mutators modify pointers within said thread states.

* * * * *